US009483026B2

(12) United States Patent

Di Domenico et al.

(10) Patent No.: US 9,483,026 B2

(45) Date of Patent: Nov. 1, 2016

(54) ANGULAR SPEED REGULATING DEVICE FOR A WHEEL SET IN A TIMEPIECE MOVEMENT INCLUDING A MAGNETIC ESCAPEMENT MECHANISM

(71) Applicant: The Swatch Group Research and Development Ltd, Marin (CH)

(72) Inventors: Gianni Di Domenico, Neuchatel (CH); Pascal Winkler, Marin (CH); Jerome Favre, Neuchatel (CH); Jean-Luc Helfer, Le Landeron (CH); Baptiste Hinaux, Lausanne (CH); Dominique Lechot, Reconvilier (CH); Patrick Ragot, Fontainemelon (CH); Fanel Piccini, Chambrelien (CH)

(73) Assignee: The Swatch Group Research and Development Ltd., Marin (CH)

( * ) Notice: Subject to any disclaimer, the term of this patent is extended or adjusted under 35 U.S.C. 154(b) by 0 days.

(21) Appl. No.: 14/579,287

(22) Filed: Dec. 22, 2014

(65) Prior Publication Data

US 2015/0177698 A1 Jun. 25, 2015

(30) Foreign Application Priority Data

Dec. 23, 2013 (EP) .................................... 13199428
Jul. 11, 2014 (EP) .................................... 14176816

(51) Int. Cl.
*G04B 15/00* (2006.01)
*G04F 5/00* (2006.01)
(Continued)

(52) U.S. Cl.
CPC ............... *G04C 5/005* (2013.01); *G04B 17/32* (2013.01); *G04C 3/04* (2013.01); *G04C 3/06* (2013.01); *G04C 3/066* (2013.01); *G04C 3/067* (2013.01); *G04C 5/00* (2013.01)

(58) Field of Classification Search
CPC .......... G04C 3/04; G04C 3/06; G04C 3/066; G04C 3/067; G04C 5/00; G04C 5/005
USPC ......................... 368/124–126, 160, 161, 163
See application file for complete search history.

(56) References Cited

U.S. PATENT DOCUMENTS 2,690,646 A * 10/1954 Clifford ................. G04C 5/005 368/126
2,946,183 A 7/1960 Clifford
(Continued)

FOREIGN PATENT DOCUMENTS

DE 19 35 486 U 3/1966
FR 1 113 932 A 4/1956
(Continued)

OTHER PUBLICATIONS

Hirose, Masakazu, English Translation of JP 52045468U, originally published Mar. 31, 1977, whole document.*
(Continued)

*Primary Examiner* — Amy Cohen Johnson
*Assistant Examiner* — Daniel Wicklund
(74) *Attorney, Agent, or Firm* — Oblon, McClelland, Maier & Neustadt, L.L.P.

(57) ABSTRACT

The invention concerns a device for regulating the relative angular speed between a magnetic structure and a resonator magnetically coupled to each other and forming an oscillator which defines a magnetic escapement. The magnetic structure includes at least one annular magnetic path at least partially formed of a magnetic material of which one physical parameter is correlated to the magnetic potential energy of the oscillator, the magnetic material being arranged along the annular path so that the physical parameter varies angularly in a periodic manner. The annular path includes, in each angular period, an area of accumulation of magnetic potential energy in the oscillator, radially adjacent to an impulse area. The magnetic material, in each accumulation area, is arranged so that the physical parameter of said magnetic material gradually increases angularly or gradually decreases angularly.

47 Claims, 23 Drawing Sheets

(51) Int. Cl.

| | |
|---|---|
| ***G04C 5/00*** | (2006.01) |
| ***G04C 3/06*** | (2006.01) |
| ***G04C 3/04*** | (2006.01) |
| ***G04B 17/32*** | (2006.01) |

(56) References Cited

U.S. PATENT DOCUMENTS

| | | | | | |
|---|---|---|---|---|---|
| 3,410,083 | A * | 11/1968 | Korr | G04C 5/005 | 368/126 |
| 3,518,464 | A * | 6/1970 | Ikeno | G04B 11/04 | 368/126 |
| 3,566,167 | A * | 2/1971 | Raval | G04C 3/105 | 368/128 |
| 3,577,874 | A * | 5/1971 | Mutter | G04C 3/105 | 368/126 |
| 3,609,958 | A * | 10/1971 | Bertsch et al. | G04C 5/005 | 368/128 |
| 3,671,825 | A * | 6/1972 | Allison | H02K 7/065 | 368/158 |
| 3,917,965 | A * | 11/1975 | Raval | G04B 11/04 | 368/126 |
| 2013/0279302 | A1* | 10/2013 | Vardi | G04C 5/005 | 368/126 |

FOREIGN PATENT DOCUMENTS

| | | | |
|---|---|---|---|
| FR | 2 075 383 | A5 | 10/1971 |
| FR | 2 132 162 | A | 11/1972 |
| GB | 1361672 | A | 7/1974 |
| JP | 52-40366 | A | 3/1977 |
| JP | 52-45468 | A | 4/1977 |
| JP | 52-63453 | A | 5/1977 |

OTHER PUBLICATIONS

Hirose, Masakazu, English Translation of JP 5240366A, originally published Mar. 29, 1977, whole document.*

European Search Report issued Jul. 17, 2014 in Patent Application No. EP 13 19 9428 (with English language translation).

* cited by examiner

ANGULAR SPEED REGULATING DEVICE FOR A WHEEL SET IN A TIMEPIECE MOVEMENT INCLUDING A MAGNETIC ESCAPEMENT MECHANISM

This application claims priority from European Patent Applications No. 13199428.7 filed on 23 Dec. 2013 and N° 14176816.8 filed on Jul. 11, 2014, the entire disclosures of which are hereby incorporated herein by reference.

FIELD OF THE INVENTION

The present invention concerns the field of devices for regulating relative angular speed between a magnetic structure and a resonator which are magnetically coupled to each other to define together an oscillator. The regulating device of the present invention regulates the working of a mechanical timepiece movement. More specifically, the invention concerns magnetic escapements for mechanical timepiece movements in which direct magnetic coupling is provided between a resonator and a magnetic structure. In general, its function is to subject the rotational frequencies of the wheel sets of a counter train of a timepiece movement to the resonant frequency of the resonator. This regulating device therefore includes a resonator having an oscillating part provided with at least one magnetic coupling element, and a magnetic escapement arranged to control the relative angular speed between a magnetic structure forming the magnetic escapement and the resonator. It replaces the sprung balance and the conventional escapement mechanism, notably a Swiss lever escapement and a toothed escape wheel.

The resonator or the magnetic structure rotates integrally with a wheel set driven in rotation with a certain drive torque which maintains the resonator oscillation. In general, the wheel set is incorporated in a gear train or more generally a kinematic chain of a mechanism. This oscillation makes it possible to regulate the relative angular speed between the magnetic structure and the resonator owing to the magnetic coupling between them.

BACKGROUND OF THE INVENTION

Devices for regulating the angular speed of a wheel, also called rotors, via a magnetic coupling, also called a magnetic connection, between a resonator and a magnetic wheel, have been known for many years in the field of horology. Several patents relating to this field have been granted to Horstmann Clifford Magnetics Ltd for the inventions of C. F. Clifford. In particular, U.S. Pat. No. 2,946,183 may be cited. The regulating devices described in these documents have various drawbacks, in particular a problem of anisochronism (defined as non-isochronism, i.e. a lack of isochronism), namely a significant variation in the angular speed of the rotor as a function of the drive torque applied to the rotor. The reasons for this anisochronism have been incorporated in the developments leading to the present invention. These reasons will become clear hereafter upon reading the description of the invention.

There are also known from Japanese Patent Application No JP 5240366 (Application No JP19750116941) and Japanese Utility Models JPS 5245468U (Application No JP19750132614U) and JPS 5263453U (Application No JP19750149018U) magnetic escapements with direct magnetic coupling between a resonator and a wheel formed by a disc. In the first two documents, rectangular apertures in a non-magnetic disc are filled with a highly magnetically permeable powder, or a magnetized material. There are thus obtained two annular, coaxial and adjacent paths, which each include rectangular magnetic areas regularly arranged with a given angular period, the areas of the first path being offset or phase shifted by a half-period relative to the areas of the second path. There are thus obtained magnetic areas, alternately distributed on either side of a circle corresponding to the position of rest (zero position) of the magnetic coupling element or member of the resonator. This coupling member or element is formed by an open loop, which, according to the case, is made of magnetized or highly magnetically permeable material, between whose ends the disc is driven in rotation. The third document describes an alternative wherein the magnetic areas of the disc are formed by individual plates of highly magnetically permeable material, with the magnetic resonator coupling element then being magnetized. The magnetic escapements described in these Japanese documents do not enable isochronism to be significantly improved, in particular for reasons which are explained below with the aid of FIGS. 1 to 4.

FIG. 1 is a schematic view of an oscillator forming a magnetic escapement 2 of the type described in the aforementioned Japanese documents, but already optimised in that the magnetic teeth 14 and 16 of the wheel 4 define annular sectors which each extend over a half-period of oscillation and in that a coupling element with a round or square end is selected for the resonator, to better allow comparison with an embodiment of the present invention shown in FIG. 5 and to demonstrate objectively the benefits of the present invention. Wheel 4 includes a first series of teeth 14, respectively separated by a first series of holes 15, which define together a first annular path. This wheel further includes a second series of teeth 16, respectively separated by a second series of holes 17, which define together a second annular path. Teeth 14 and 16 are formed by a highly magnetically permeable material, in particular a ferromagnetic material. The two series of teeth are respectively connected by an outer ring 18 and an inner ring 19 formed of the same magnetic material. The two annular paths are adjacent and delimited by a circle 20, which corresponds to the rest position of magnet 12, located at the centre thereof, of resonator 6 for every angular position of wheel 4, i.e. to the position in which the resonator has minimum elastic deformation energy.

The resonator is symbolically represented by a spring 8, corresponding to its elastic deformation capacity defined by an elastic constant, and by inertia 10 defined by its mass and structure. The resonator is capable of oscillating at a natural frequency in at least one resonant mode wherein magnet 12 oscillates radially. It will be understood that this schematic representation of resonator 6 means, within the scope of the invention, that it is not limited to a few specific variants. The essential is that the resonator includes at least one magnetic coupling element 12 for magnetically coupling the resonator to the magnetic structure of wheel 4, which, in the example shown in FIG. 1, is driven in rotation by a drive torque in the anticlockwise direction at angular speed ω. Magnet 12 is thus located above wheel 4 and is capable of oscillating radially about the zero position located on circle 20. Since magnetic teeth 14 and 16 form areas of magnetic interaction located alternately on either side of central circle 20, they define a wavy magnetic path with a determined angular period $P_\theta$, which corresponds to the angular period of each of the first and second angular paths. When the resonator is magnetically coupled to the wheel, so that magnet 12 oscillates along the wavy magnetic path defined by the wheel, the angular speed ω of the wheel is substantially defined by the resonator oscillation frequency.

FIG. 2 is a schematic view, on one portion of wheel 4, of the magnetic potential energy (also called magnetic interaction potential energy) of oscillator 2 which varies angularly and radially according to the magnetic structure of the wheel. The level curves 22 correspond to various magnetic potential energy levels. They define equipotential curves. The magnetic potential energy of the oscillator at a given point corresponds to the state of the oscillator when the magnetic resonator coupling element is in a given position (its centre being located at this given point). It is defined to within one constant. In general, magnetic potential energy is defined with respect to a reference energy which corresponds to the minimum potential energy of the device concerned, in this case the oscillator. In the absence of dissipative force, this potential energy corresponds to the work necessary to bring the magnet from a minimum energy position to a given position. In the case of the oscillator concerned, the work is provided by the drive torque applied to wheel 4. The potential energy accumulated in the oscillator can be transferred to the resonator when the magnet returns to a lower energy position, in particular a minimum energy position, by a radial movement relative to the axis of rotation of the wheel (i.e. according to the degree of freedom of the useful resonant mode). In the absence of dissipative force, this potential energy is converted into kinetic energy and elastic energy in the resonator by the work of the magnetic force between the resonator coupling element and the magnetic structure. This is how the drive torque supplied to the wheel is used to maintain the resonator oscillation which in return brakes the wheel by regulating its angular speed.

The outer annular path defines alternating areas of minimum energy 24 and areas of maximum energy 25 while the inner annular area defines, with a phase shift of an angular half-period $P_\theta/2$ with respect to the first path (i.e. a phase shift of 180°), alternating areas of minimum energy 28 and areas of maximum energy 29. FIG. 3 shows two outlines 32 and 34 giving the position of the centre of magnet 12 when oscillator 2 is operating and when wheel 4 is thus driven in rotation with angular speed regulation. These outlines are thus a representation of the oscillation of the magnet with two different amplitudes within a reference frame linked to the wheel. An examination of the magnetic potential energy level curves 22 and the oscillations 32 and 34 reveals that the oscillator accumulates magnetic potential energy with each vibration in accumulation areas 26 and 30. The force exerted on the resonator magnet is given by the magnetic potential energy gradient, this gradient being perpendicular to level curves 22. The angular component (degree of freedom of the wheel) works by reaction on the wheel while the radial component (degree of freedom of the resonator) works on the resonator coupling member. In the accumulation areas, the angular force corresponds to a braking force of the wheel since the angular reaction force opposes the direction of rotation of the wheel. When the magnetic force is essentially angular in the accumulation areas, the accumulation of magnetic potential energy accumulation in the oscillator is said to be “pure”.

In FIGS. 2 and 3, the pure accumulation areas define substantially annular areas $Z1_{ac}$* and $Z2_{ac}$*. The accumulated energy is then transferred to the resonator in a central impulse area $ZC_{imp}$*. In central area $ZC_{imp}$* and, more precisely, in the impulse areas where the oscillations of the magnet pass, the magnetic potential energy gradient has a radial component which gradually increases with rotation of the wheel, whereas the angular component decreases to eventually become zero. This gradient corresponds to a thrust force for the magnet and thus to an impulse. When the amplitude is relatively high (oscillation 32), it is noted that the thrust force is applied over the entire width of the central area between points $PE_1$ and $PS_1$. For a lower amplitude (oscillation 34), the passage through central area $ZC_{imp}$* extends over a greater angular distance between points $PE_2$ et $PS_2$ and, in the first half of the crossing of the central area (approximately as far as central circle 20), the oscillation is substantially free, a lower energy impulse being given only in the second half of the crossing.

Generally, an “accumulation area” means an area in which the magnetic potential energy in the oscillator increases for the various oscillation amplitudes of the useful drive torque range; and an “impulse area” means an area in which this magnetic potential energy decreases for the various oscillation amplitudes of the useful drive torque range and where a magnetic thrust force is exerted on the resonator coupling member along a degree of freedom. “Thrust force” means a force in the direction of motion of the oscillating coupling member. Thus, although this thrust force may already exist in an accumulation area, this description will refer to impulse areas as being outside the accumulation areas.

To understand the level curves 22 shown in FIGS. 2 and 3, it is necessary to consider an important aspect of the embodiment of oscillator 2 for it to be functional. In particular, in the field of horology, the drive torque supplied by a barrel varies significantly as a function of the mainspring tension level. To ensure that the timepiece movement works over a sufficiently large period, the movement is generally required to be able to be driven by a torque varying between a maximum torque and approximately half the maximum torque. Moreover, it is of course also necessary to ensure proper operation at maximum torque. In practice, to ensure such operation and prevent, in particular, the oscillator becoming uncoupled at a relatively high oscillation amplitude, braking areas 26 and 30 are required to extend over a certain angular distance and braking must thus be gradual. This situation is obtained partly, and in a non-optimum manner, with background art oscillators by an averaging effect essentially resulting from the angular extent of the magnetic coupling member or element of the resonator in projection in the general plane of the wheel, and from the relatively large air gap between this member and the magnetic structure of the annular paths of the wheel (more generally of the rotor or rotating wheel set).

The averaging is obtained by integration over the entire coupled magnetic field, which extends over an area of the magnetic structure, whose size increases with the size of the end surface of the magnet parallel to said general plane and with the size of the air gap. Thus, the vertical flank of a magnetic tooth adjacent to an opening in the magnetic structure concerned, in the magnetic potential energy space, gives level curves 22 which extend over an angular distance which increases with the averaging effect. The case analysed here used a magnet having a circular or square section parallel to the general plane of the wheel. The dimension selected for this section and the selected air gap already provide a more favourable arrangement than those of the aforecited background art devices for operation of the oscillator, since brake pads 26 and 30 are ensured to be sufficiently extensive while already slightly limiting the radial distance of the central impulse area.

When the behaviour of the oscillator considered above is analysed according to the drive torque applied to the wheel, there are observed at least two drawbacks of such a regulating device. First of all, the range of values for the drive torque is relatively reduced and there is significant anisochronism. This is shown in the graph of FIG. 4, which shows the relative angular speed error $(\omega-\omega_0)/\omega_0$ of wheel 4, ($\omega_0$ being the nominal angular speed) relative to the relative torque $M_{rot}/M_{max}$ applied to the wheel (for a resonator quality factor of around 200). Angular frequency $\omega_0$ is mathematically linked to the natural frequency $F_{res}$ of the useful resonator oscillation by the formula $\omega_0=2\pi F_{res}/N_P$, $N_P$ being the number of angular periods of the first and second annular paths. The various points 36 define a curve 38 corresponding to a high anisochronism for a timepiece application. Indeed, a relative error of $5\cdot 10^{-4}$ corresponds to a very significant daily rate error, namely around forty seconds (40 s). Next, instability is observed in the oscillator behaviour when the relative torque is close to 80% (0.8), as evidenced by point 40. Thus, to obtain accuracy of less than ten seconds per day for the timepiece movement, the relative torque must remain within a narrow range of between 0.6 (60%) and 0.8 (80%). In practice, the timepiece movement must be devised so that the maximum acceptable torque corresponds to the maximum torque applied to wheel 4, so that torque will have to remain above 80% in this practical case. As soon as this lower limit is approached, the anisochronism increases rapidly and becomes enormous once the lower limit is passed. This explains one significant reason for the lack of success of such magnetic escapements although they have been known for dozens of years.

SUMMARY OF THE INVENTION

In the context of the present invention, having noted the problems of anisochronism and the limited operating range of the aforementioned known regulating devices, the inventors endeavoured to understand the reasons for these problems and to provide a solution.

Reflections on the problems of the background art and various research made it possible to identify the causes of these problems. The problem of anisochronism and also that of the limited useful drive torque range are due, in particular, to the fact that the impulses given to the resonator magnet extend over a relatively large radial distance outside a localised area around the zero position circle. This reduces the annular areas of pure accumulation and also disrupts the working of the oscillator. Indeed, the only impulses which barely disrupt the oscillator are those located at the location of this zero position circle. The inventors therefore observed that a thrust force on a relatively broad path outside said localised area disrupts the resonator; which varies its frequency as a function of the torque supplied and is thus a source of anisochronism.

To overcome the problem of the very broad central impulse area while allowing for efficient and stable operation of the oscillator over a relatively large range of torque, the present invention proposes a device for regulating the relative angular speed between a magnetic structure and a resonator, which are magnetically coupled to define together an oscillator forming the regulating device, as defined in claim 1.

Generally, the regulating device according to the invention has the following characteristics: The magnetic structure includes at least one annular magnetic path centred on an axis of rotation of this magnetic structure or of the resonator, which are arranged to undergo a rotation relative to each other about the axis of rotation when a drive torque is applied to the magnetic structure or to the resonator. The annular magnetic path is at least partially formed of a first magnetic material having at least a first physical parameter correlated to the magnetic potential energy of the oscillator but different therefrom. This first magnetic material is arranged along the annular magnetic path so that the magnetic potential energy varies angularly in a periodic manner along said annular magnetic path and so that it defines an angular period ($P_\theta$) of the annular magnetic path. The resonator includes at least one magnetic coupling element (also called a magnetic coupling member) for coupling to the magnetic structure. This magnetic coupling element is formed of a second magnetic material, having at least a second physical parameter correlated to the magnetic potential energy of the oscillator, and is magnetically coupled to the annular magnetic path so that an oscillation along a degree of freedom of a resonant mode of the resonator is maintained within a useful drive torque range applied to the magnetic structure or to the resonator and so that an integer number of periods, in particular and preferably one period, of this oscillation occurs during said relative rotation in each angular period of the annular magnetic path; the oscillation frequency thereby determining the relative angular speed. Within the useful drive torque range, the annular path and the magnetic coupling element define, in each angular period, according to their relative position defined by their relative angular position and the position of the coupling element along its degree of freedom, a magnetic potential energy accumulation area in the oscillator.

In a main embodiment, the resonator is arranged with respect to the magnetic structure so that an active end portion of the coupling element, located on the side of the magnetic structure, is at least mostly superposed, in orthogonal projection to a general geometric surface defined by the annular magnetic path, on said annular magnetic path for substantially one first vibration in each oscillation period of said coupling element, and so that the travel of the magnetic coupling element during this first vibration is substantially parallel to said general geometric surface. Next, the dimension of the annular magnetic path along the degree of freedom of the resonator coupling element is greater than the dimension of the active end portion of the coupling element along this degree of freedom. For the comparison of these two dimensions, the latter are measured in orthogonal projection to the general geometric surface defined by the annular magnetic path along an axis of the degree of freedom passing by the center of mass of the active end portion of the coupling element. This axis can be rectilinear or curvilinear. The first magnetic material is arranged in each angular period such that, at least in one area of this first magnetic material magnetically coupled at least partially to the active end portion of the magnetic coupling element for the relative positions of the magnetic coupling element with respect to the annular magnetic path corresponding to at least one portion of the magnetic potential energy accumulation area in this angular period, the first physical parameter gradually increases angularly or gradually decreases angularly. It will be noted that the selection is made between an increase or a decrease in the physical parameter so that the magnetic potential energy of the oscillator increases angularly during said relative rotation; which implicitly results from the fact that the areas concerned are magnetic potential energy accumulation areas.

According to a variant, the aforementioned angular variation in the first physical parameter is provided in an area of the first magnetic material corresponding to at least most of the magnetic potential energy accumulation area in each angular period. According to a preferred variant, the angular variation in the first physical parameter is provided in an area of the first magnetic material substantially corresponding to the entire magnetic potential energy accumulation area in each angular period. In a particular variant, the first physical parameter angularly defines an increasing monotone function, or respectively a decreasing monotone function.

A "magnetic material" means a material having a magnetic property generating an external magnetic field (magnet) or a good magnetic flux conductor which is attracted by a magnet (in particular a ferromagnetic material).

According to a preferred variant, the magnetic potential energy in each accumulation area exhibits substantially no variation along the degree of freedom of the useful resonant mode of the resonator. In particular, the physical parameter variation concerned is only angular, i.e. this physical parameter is substantially constant in a radial direction, in each area of said first magnetic material corresponding to a magnetic potential energy accumulation area in the oscillator. There is therefore a substantially pure accumulation of magnetic potential energy in these useful accumulation areas.

According to a particular variant of the invention, the gradual increase or decrease in the first physical parameter of the first magnetic material, respectively the second physical parameter of the second magnetic material, extends over an angular distance of more than twenty percent (20%) of the angular period of the annular magnetic path. According to another particular variant, the ratio between the angular distance of variation in the first physical parameter, respectively the second physical parameter, and the angular period is higher than or substantially equal to forty percent (40%).

According to a preferred variant of the invention, the magnetic coupling element and the annular magnetic path are arranged so that, during the aforementioned relative rotation between the resonator and the magnetic structure, the magnetic coupling element receives impulses along a degree of freedom about a rest position of the magnetic coupling element. These impulses define, as a function of the relative position of the magnetic coupling element with respect to the annular magnetic path and for the useful drive torque range supplied to the regulating device, impulse areas which are substantially located in a central impulse area adjacent to the magnetic potential energy accumulation areas. In a particular variant, the ratio between the radial dimension of the impulse areas and the radial dimension of the magnetic potential energy accumulation areas is less than fifty percent (50%). In a preferred variant, this ratio is less than or substantially equal to thirty percent (30%).

In another preferred variant, the magnetic structure is arranged so that the mean angular gradient of the magnetic potential energy of the oscillator in the magnetic potential energy accumulation areas is significantly less than the mean magnetic potential energy gradient in the impulse areas along the degree of freedom of the resonator and in the same unit. Thus, the variation in the first physical parameter of the first magnetic material, respectively in the second physical parameter of the second magnetic material, is greater in the impulse areas along the degree of freedom of the resonator, in particular radially, than angularly in the magnetic potential energy accumulation areas. This physical parameter variation in the impulse areas may be sharp, notably generated by a radial discontinuity of the first magnetic material, respectively of the second magnetic material, along an axial projection of the zero position circle in the general plane of the magnetic structure, respectively along the zero position circle in the general plane of the coupling element.

Other particular features of the invention form the subject of dependent claims and will be set out below in the detailed description of the invention.

BRIEF DESCRIPTION OF THE DRAWINGS

The invention will be described below with reference to the annexed drawings, given by way of non-limiting example, and in which.

DETAILED DESCRIPTION OF THE INVENTION

Figure 1:
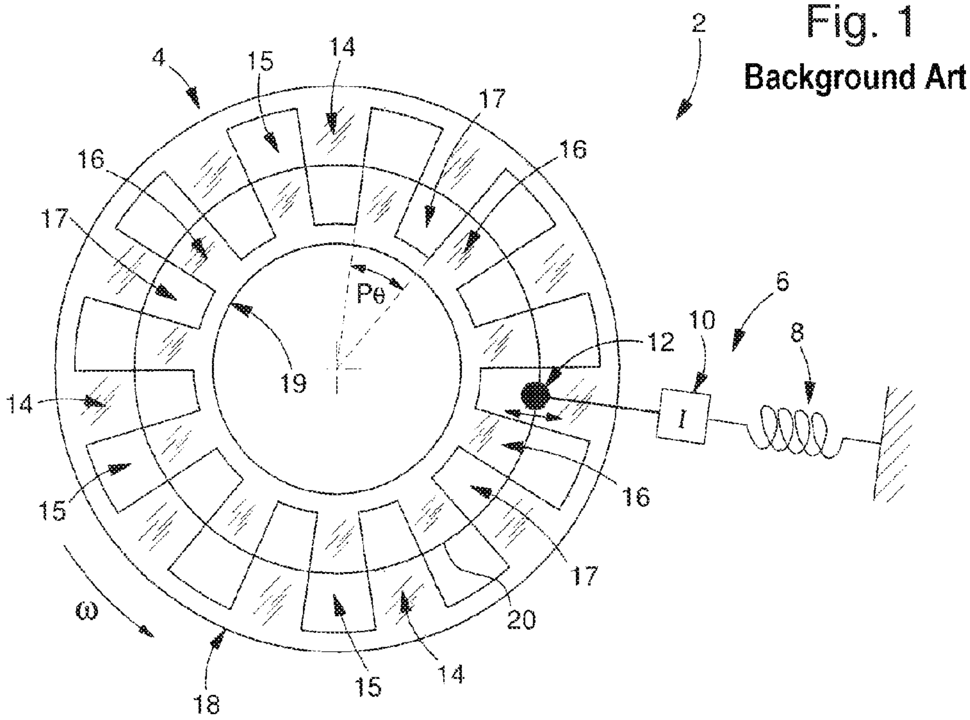
Fig. 1 Background Art
FIG. 1, already described, is a schematic top view of a background art regulating device.

With reference to FIGS. 5 to 10, there will be described a first embodiment of a device for regulating the relative angular speed ω between a magnetic structure 44 and a resonator 46, which are magnetically coupled to define together an oscillator 42. This regulating device advantageously defines a magnetic escapement. The magnetic structure includes a first annular magnetic path 52 and a second annular magnetic path 53 centred on an axis of rotation 51 of the magnetic structure and formed of a magnetic material 45 having at least a first physical parameter which is correlated to the magnetic potential energy $EP_m$ of oscillator 42, said physical parameter being other than the potential energy. Axis of rotation 51 is perpendicular to the general plane of the magnetic structure. The magnetic material is arranged along each annular magnetic path so that the physical parameter varies angularly in a periodic manner and thereby defines an angular period $P_\theta$ of the magnetic path. It will be noted that, in another embodiment, the second annular magnetic path may have a periodic variation of another physical parameter of the magnetic material or, in a particular variant, of another magnetic material also correlated to the magnetic potential energy $EP_m$ of the oscillator. It will be noted that the considered physical parameter is a specific parameter of the magnetic structure which exists independently of the relative angular position θ between the magnetic structure and the resonator coupling member. However, this physical parameter may be a geometrical parameter which is related to the spatial positioning of the coupling member. In particular, for a given radius inside an annular magnetic path, this physical parameter is a distance between the surface of the magnetic material and a circle defined by the centre of mass of the active end portion of the coupling member in a corresponding position of its degree of freedom, in a reference frame associated with the magnetic structure, during a relative rotation between the latter and the coupling member. Generally, in the case under consideration here, the physical parameter, in a reference framework linked to the magnetic structure, is a distance between the annular magnetic path and a surface of revolution having the axis of rotation of the magnetic structure as axis of revolution and the degree of freedom of the coupling element as generatrix of this surface of revolution. This distance substantially corresponds, to within one constant, to an air gap between the magnetic coupling element and the annular magnetic path concerned.

The resonator includes a member or element for magnetic coupling to the magnetic structure 44. This coupling element or member is formed here by a magnet 50 which is cylindrical or has the shape of a rectangular parallelepiped. Further, this resonator is symbolised by a spring 47, representing its capacity for elastic deformation defined by an elastic constant, and by an inertia 48 defined by its mass and structure. Magnet 50 is positioned relative to the magnetic structure such that, in its rest position, corresponding here to the minimal elastic deformation energy of the resonator, the centre of mass of the active end portion of the coupling element opposite the magnetic structure is substantially located on a zero position circle 20 for every angular position θ of the magnetic structure relative to the magnet. "Active end portion" means the end portion of the coupling element, located on the side of the magnetic structure concerned, through which most of the coupling magnetic flux flows between the coupling element and the magnetic structure. The zero position circle is centred on axis of rotation 51 and has a radius substantially corresponding to the inner radius of the first annular path and to the outer radius of the second annular path, these inner and outer radii being merged here. In other words, the zero position circle 20 is located substantially on the geometric circle defined by the interface between these two coaxial and contiguous magnetic paths, i.e. this geometric circle corresponds to a projection of the zero position circle on the general plane of the magnetic structure. In a variant, the two magnetic paths are remote and separated by an intermediate area formed entirely by the same medium. In this latter case, the zero position circle is located between the two magnetic paths substantially in the middle of the intermediate area. An intermediate area of this type, whose width will be kept small for various reasons, may be useful for ensuring that the oscillator is easy to start. A first reason relates to the small dimension provided for the coupling element along a degree of freedom and radially relative to the axis of rotation, given that the oscillator must be prevented from "idling" with the coupling element remaining substantially on the zero position circle. Another reason will appear below: The object is to obtain localised impulses which are close and preferably centred on the zero position circle.

Figure 6A:
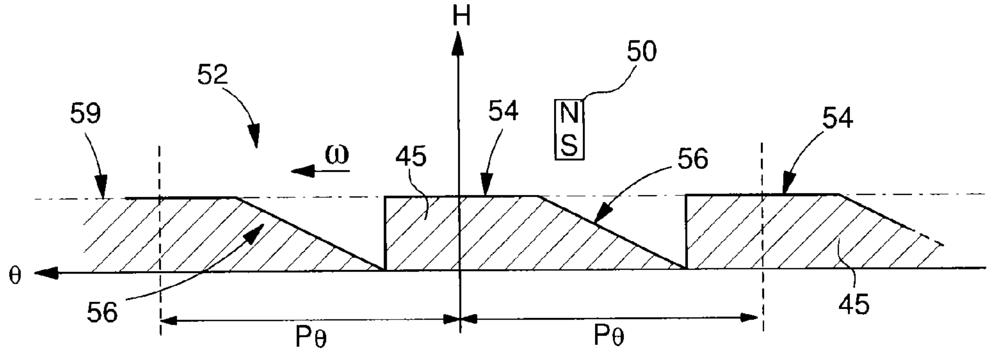
FIGS. 6A and 6B are angular cross-sections respectively along the two annular paths defined by the magnetic structure.
Figure 6B:
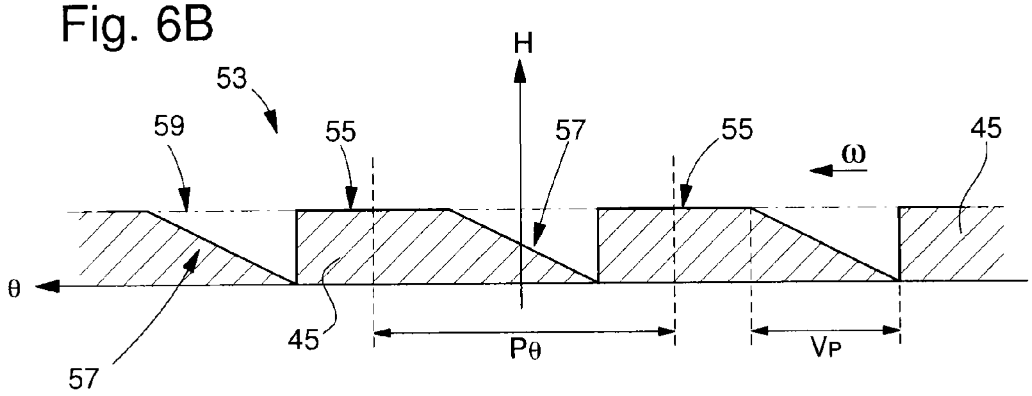

FIGS. 6A and 6B show two cross-section of two circles respectively passing through the middle of the first annular magnetic path and the middle of the second annular magnetic path. These coaxial first and second annular magnetic paths 52 and 53 are separated by an angular shift equal to half of the aforementioned angular period, namely a phase shift of π (180°). In the variant shown, the considered physical parameter in the first place is related to an air gap between magnet 50 and magnetic material 45, formed of a highly magnetically permeable material and, in particular, of a ferromagnetic material. It will be noted that, in another variant, the magnetic material is a magnetized material arranged for attraction relative to magnet 50. Another physical parameter also varies concomitantly, namely the thickness of the highly magnetically permeable material or, in the other variant mentioned, of the magnetized material. More specifically, annular path 52 alternately includes annular sectors 54, in which the magnetic material has a maximum thickness, and annular sectors 56, in which the thickness of the magnetic material gradually decreases in the opposite direction to the direction of rotation of magnetic structure 44, relative to magnet 50. In the variant shown here, the angular distance of each sector 56 is substantially equal to the angular distance of each sector 54, whose value is substantially one angular half-period $P_\theta/2$. In another variant, the magnetic path magnets and the resonator magnet forming said coupling element are arranged to repulse each other. In this variant, to obtain an equivalent effect to that described above, the thickness of the magnetic material gradually increases in each sector 56 in the opposite direction to the direction of rotation of the magnetic structure relative to magnet 50.

In annular sectors 56, the thickness decreases from around the maximum thickness to a virtually zero thickness over a distance $V_P$; but other variants are possible, as will be explained below. The variation in thickness causes a variation in the mean air gap for the magnetic field coupled between magnet 50 and magnetic material 45 formed of a highly magnetically permeable material or a magnetized material arranged to attract magnet 50. This mean air gap gradually increases, in the opposite direction to the direction of rotation of magnetic structure 44 relative to magnet 50, over a certain angular extent substantially corresponding to the angular distance of each annular sector 56. To avoid a problem of clarity as regards averaging, arising from the non-zero extension of coupling element 50 and of the air gap, the averaging also causing a variation in the mean air gap, in the context of the present invention, reference will be made to an air gap variation, along an axis perpendicular to the general plane of the magnetic path in question, between the centre of mass of the active end portion of the coupling member and the magnetic path. In FIGS. 6A and 6B, it may be considered that the lower surface of magnet 50 opposite the magnetic paths is the active end portion, and the geometric centre of this lower surface is the centre of mass, since the geometric centre and the centre of mass are axially aligned here. Annular path 53 alternately includes, in a similar manner to annular path 52, annular sectors 55, in which magnetic material 45 has a maximum thickness, and annular sectors 57, in which the thickness of the magnetic material gradually decreases. This annular path 53 is substantially equivalent to annular path 52, but they are shifted by an angular half-period $P_\theta/2$ to define a wavy magnetic path for magnet 50, as previously explained. Although the considered physical parameter here relates to the air gap between the magnet and each annular magnetic path, i.e. to the distance between the top surface of the magnetic material and the bottom surface of magnet 50, this physical parameter corresponds to a specific parameter of the magnetic structure. Indeed, the considered physical parameter is a distance to a plane 59 which is parallel to the general plane of the magnetic structure. Moreover, this general plane is also parallel to an oscillation travel of the magnet.

It will be noted that, according to other variants that are not shown, the magnetic structure may be arranged so that only one or other of the two aforementioned physical parameters varies, namely the air gap between the magnetic coupling element of the resonator and the magnetic structure, or the thickness of this magnetic structure. It will be noted that, in the event that only the thickness varies, for example by performing a planar symmetry on magnetic structure 44 (which means turning it over without varying the position of magnet 50), the magnetic potential energy variation correlated only to thickness finds particular application in a magnetized material, since the magnetic flux intensity can easily vary as a function of the thickness of the magnetized material. Since the coupling element has a certain dimension, this thickness is defined as the thickness of the magnetic path in question along an axis perpendicular to the general plane of the magnetic path and passing through the centre of mass of the active end portion of the coupling member. In the event of a highly magnetically permeable material, a simple variation in thickness is more limited. Indeed, the range of thicknesses concerned must then correspond to a situation where the magnetic flux is saturated in at least one portion of the variable section of magnetic material through which the magnetic flux flows. Otherwise, the variation in thickness will have no significant effect on the magnetic potential energy of the oscillator.

Figure 5:
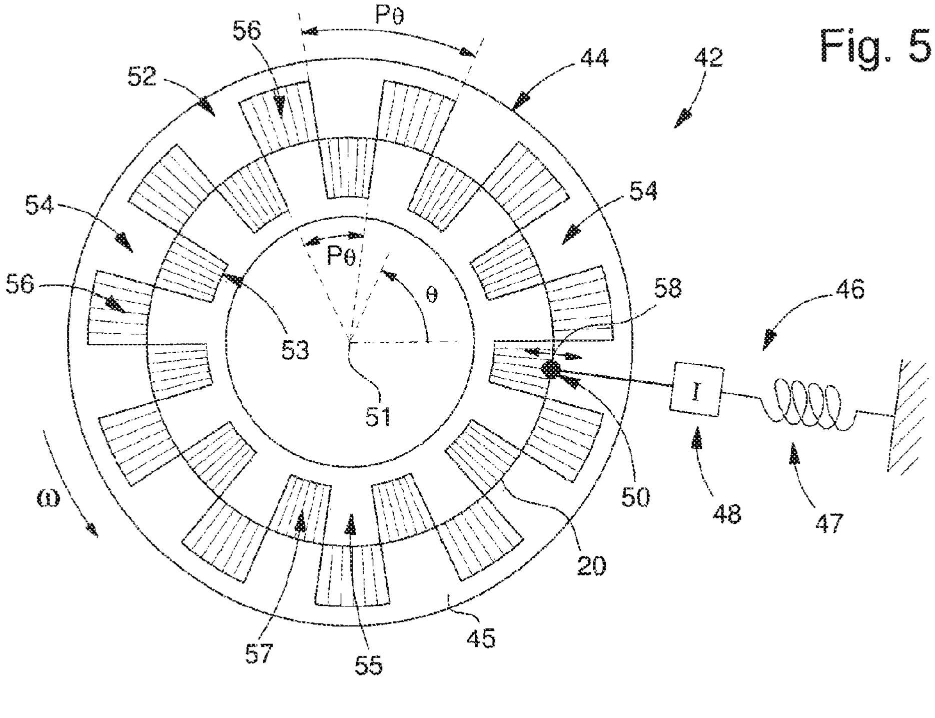
FIG. 5 is a schematic top view of a first embodiment of the regulating device according to the invention.
Figure 11:
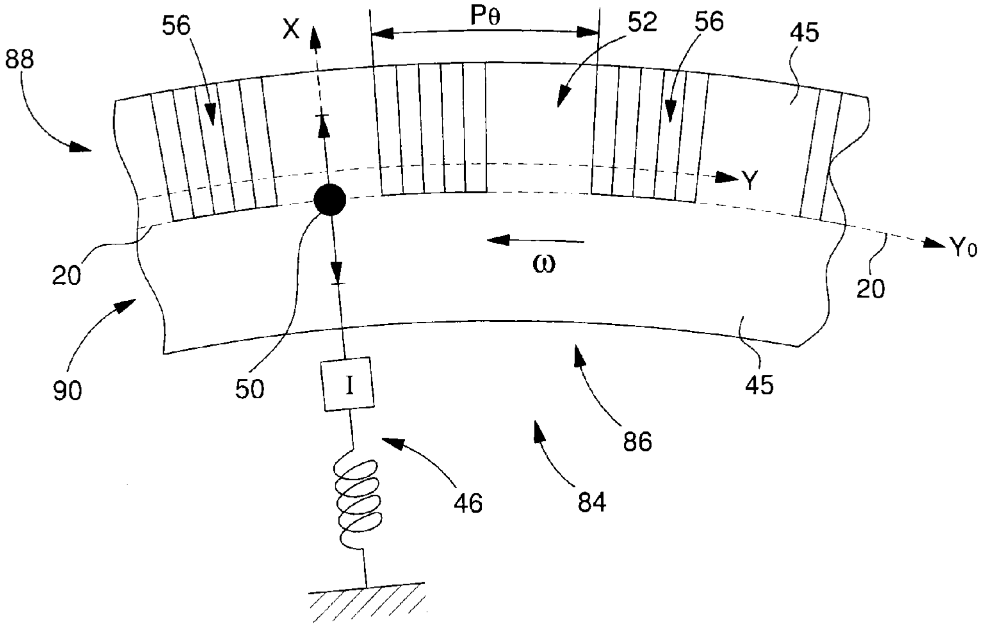
FIG. 11 is a partial, schematic, top view of a second embodiment of a regulating device according to the invention.

Magnet 50 is coupled to the first and second annular paths so that an oscillation 71, respectively 72 (FIG. 8) along one degree of freedom 58 of a resonant mode of resonator 46 is maintained within a useful drive torque range applied to the magnetic structure. The oscillation frequency determines the relative angular speed ω. In projection in a general plane of the magnetic structure (parallel to the plane of FIGS. 5, 7 and 8), Oscillation 71, respectively 72 has first vibrations 71*a*, respectively 72*a*, in a first area superposed on first annular path 52 and second vibrations 71*b*, respectively 72*b* in a second area superposed on second annular path 53. Generally, the degree of freedom of the resonator coupling element is selected such that the travel of the magnetic coupling element in the first vibrations, respectively second vibrations, of its oscillation during magnetic coupling to the magnetic structure, is substantially parallel to a general geometric surface of the first annular magnetic path, respectively of the second annular magnetic path. In a first main embodiment, corresponding in particular to that of FIG. 5 and to that of FIG. 11 described below, the general geometric surface defined by the annular magnetic path(s), or generally by the magnetic structure, is a general plane perpendicular to the axis of rotation of the magnetic structure. In the embodiments of FIGS. 5 and 11, the degree of freedom of the resonator is entirely within a parallel plane to this general plane. Thus, the entire travel of the magnetic coupling element during its oscillation is parallel here to the general plane of the magnetic structure. In a variant of a second main embodiment, corresponding to that of FIGS. 28 and 29 described below, the two annular magnetic paths form the lateral wall of a disc and define a general geometric surface which is a cylindrical surface whose central axis is the axis of rotation of the magnetic structure. It will be noted that other arrangements may be envisaged, for example magnetic paths whose general geometric surface is conical. In variants, the travel of the oscillating element is substantially within a parallel plane to the general plane defined by the magnetic structure; the travel may diverge slightly particularly at the end points of oscillation especially if the amplitude is high. This situation occurs, for example, when the resonator coupling element oscillates along a substantially circular travel with an axis of rotation parallel to the general plane of the magnetic structure. In that case, it is preferably provided that the direction defined by the degree of freedom of the coupling element in its rest position is substantially parallel to a plane tangent to said general geometric surface in a point corresponding to the orthogonal projection of the center of mass of the active end portion of the coupling element in its rest position.

Figure 7:
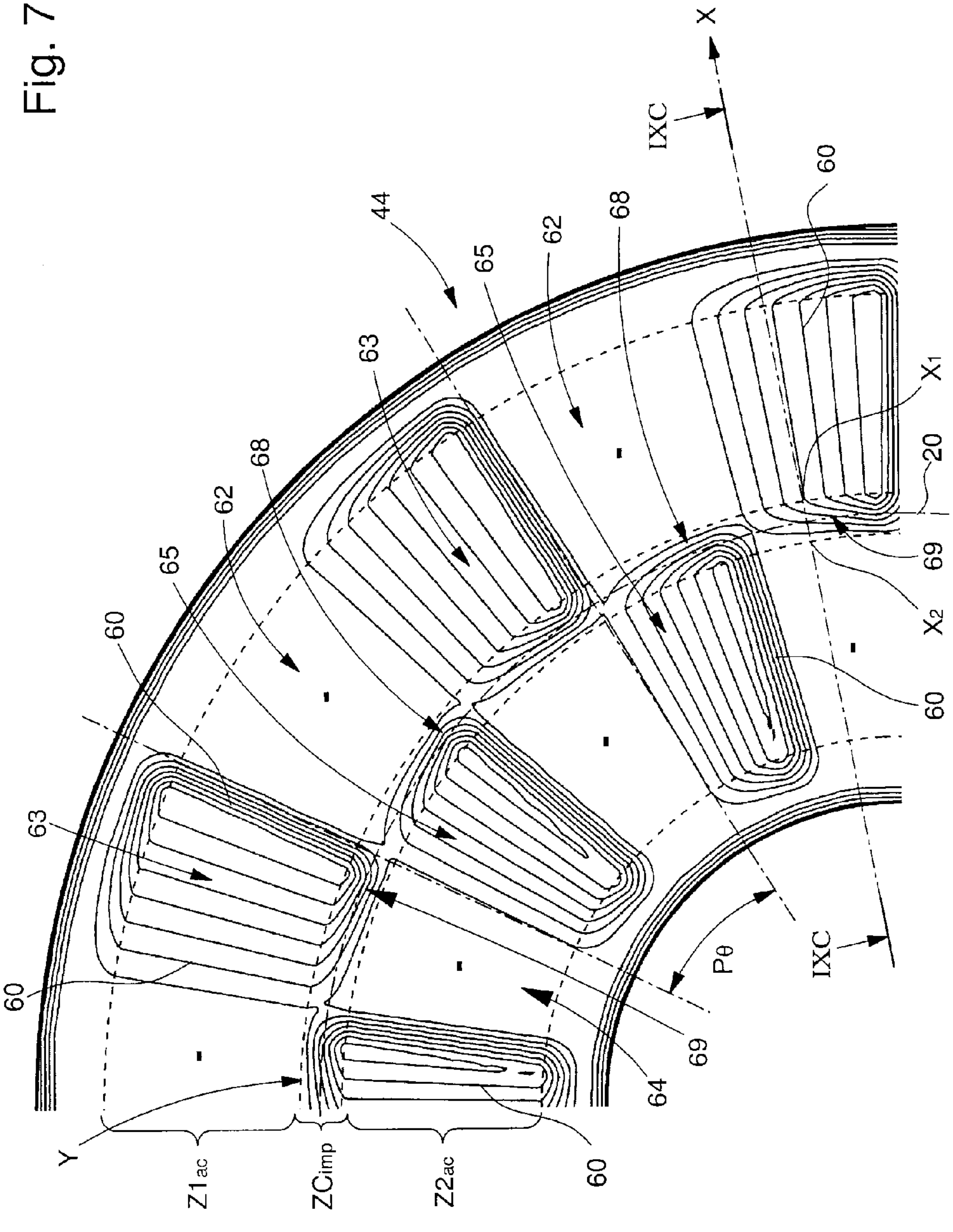
FIGS. 7 and 8 show the magnetic potential energy of the regulating device of FIG. 5 and the outlines corresponding to two resonator oscillations.
Figure 8:
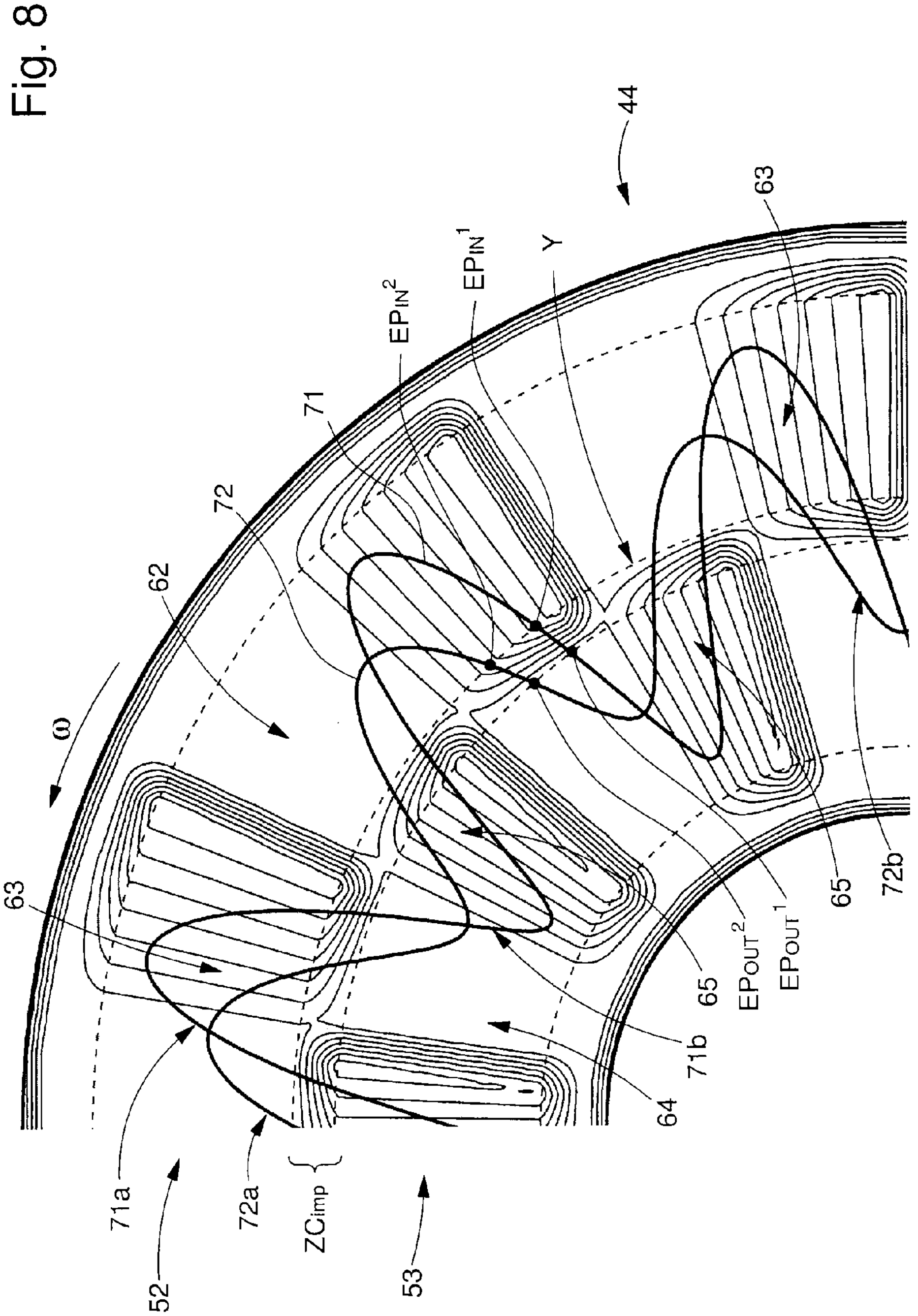

FIGS. 7 and 8 show schematic views, on one portion of magnetic structure 44, of the magnetic potential energy $EP_m$ of oscillator 42 which varies according to the magnetic structure, namely to two annular paths 52 and 53. There is described here a variant wherein the magnetic force is an attraction force, in particular with a magnetic structure formed of a ferromagnetic material. The level curves 60 correspond to various levels of magnetic potential energy, as explained with reference to FIGS. 2 and 3.

Figure 9A:
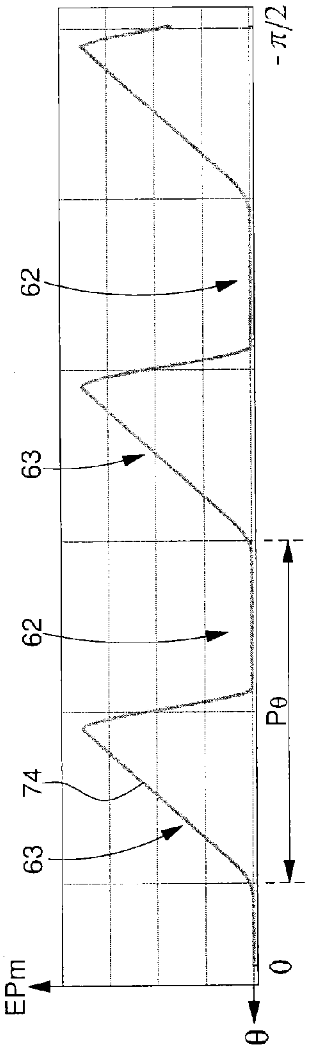
FIGS. 9A and 9B show the profiles of the magnetic potential energy respectively along the middle of the two annular paths defined by the magnetic structure, and FIG. 9C gives the transverse profile of this magnetic potential energy.
Figure 9B:
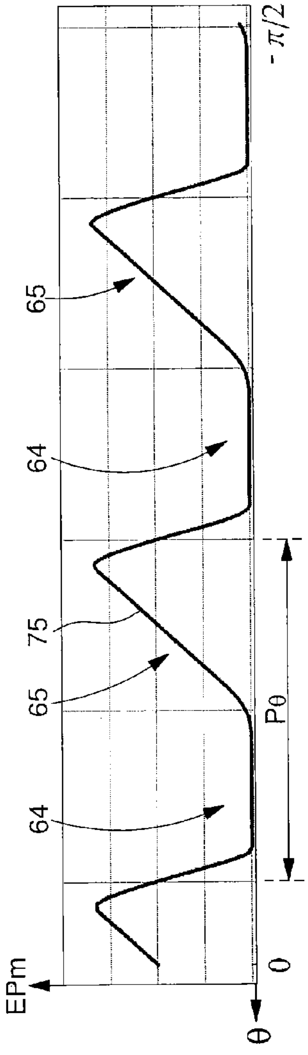
Figure 9C:
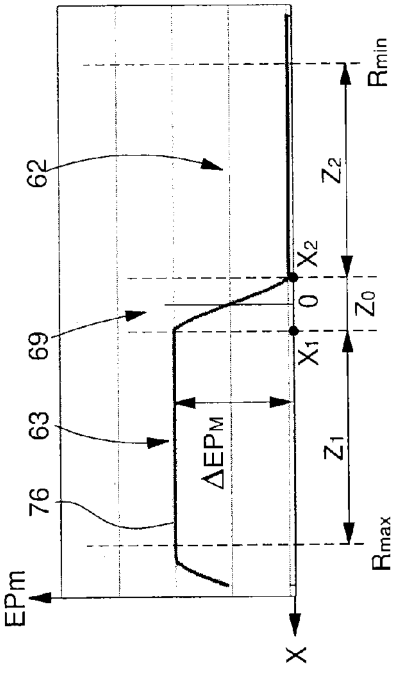

FIGS. 9A and 9B show the profiles of the magnetic potential energy respectively along the middle of each of the two annular magnetic paths 52 and 53; while FIG. 9C shows the radial profile of the magnetic potential energy along axis X (FIG. 7) corresponding to the degree of freedom of resonator 46. It will be noted that a similar situation to that described in FIGS. 7, 8 and 9A-9C is obtained with magnetic paths formed by magnets arranged in repulsion to the magnet forming the resonator coupling element. In this variant, the variation in the air gap and/or the thickness of the magnetized material is inverted with respect to the variants described above, particularly that of FIGS. 6A and 6B. Thus, the annular path alternately includes annular sectors in which the magnetized material has a minimum thickness (including zero), and annular sectors in which the thickness of the magnetized material gradually increases in the opposite direction to the direction of rotation of the magnetic structure relative to magnet 50, these latter annular sectors creating magnetic potential energy accumulation areas in the oscillator.

In the useful drive torque range applied to the rotor carrying magnetic structure 44, each annular magnetic path 52, 53 includes, in each angular period $P_\theta$, a useful magnetic potential energy accumulation area 63, respectively 65 in the oscillator. These areas 63 and 65 are respectively located substantially in a first annular energy accumulation area $Z1_{ac}$ and a second annular energy accumulation area $Z2_{ac}$. "Useful accumulation area" generally means an area swept by the magnetic field of magnet 50, which oscillates with various amplitudes in the entire range of amplitudes provided (corresponding to the useful drive torque range) and in which the oscillator mainly accumulates magnetic potential energy $EP_m$ to be transmitted subsequently to the resonator. This area is thus delimited by the minimum oscillation amplitude of the resonator coupling element, corresponding to the minimum useful torque, and the maximum oscillation amplitude corresponding to the maximum useful torque. According to a preferred variant embodiment, shown in FIG. 7, the magnetic potential energy in each useful accumulation area exhibits substantially no variation along the degree of freedom of the useful resonant mode of the resonator. Thus, the gradient $EP_m$ is mainly angular in the useful accumulation areas, this angular gradient corresponding to a braking force acting on the magnetic structure and overall generating a braking torque. Therefore, first and second annular areas $Z1_{ac}$ and $Z2_{ac}$ are here areas of pure magnetic potential energy accumulation. It will be noted that the magnetic potential energy in the Figures is given locally for a position of the coupling element located at the centre of mass of the active end portion of the coupling element (other points of reference may be provided ensuring that the same reference point is maintained for the various parameters concerned relative to the coupling member). Thus, the accumulation areas and also the impulse areas described below, are defined and represented using the position of the centre of mass of the active end portion of the coupling element.

The first and second annular areas $Z1_{ac}$ and $Z2_{ac}$ are separated by a central impulse area $ZC_{imp}$ defined by impulse areas 68 and 69 in which transfers of energy are respectively made to the resonator as a function of the drive torque, as explained above in relation to the background art. Each impulse area 68, 69 is defined by an area swept by the magnetic field of magnet 50 for various oscillation amplitudes between the aforementioned minimum amplitude and maximum amplitude. The central impulse area includes the zero position circle 20 located substantially at the middle of this central impulse area. The zero position circle is defined as the circle described by the reference point of the coupling member in its rest position (reference point used to establish the equipotential curves of the magnetic potential energy in space as a function of the polar coordinates of the rotor/magnetic structure) taken on the magnetic structure during a relative rotation between the resonator and the magnetic structure. Preferably, the resonator coupling member is arranged radially relative to the axis of rotation so that the zero position circle passes substantially through the middle of all the impulse areas associated with said coupling element. The circle Y defines the interface between area $Z1_{ac}$ and area $ZC_{imp}$. This circle Y is centred on the axis of rotation of magnetic structure 44 and has a radius $R_Y$.

In FIG. 9C, curve 76 corresponds to a radial profile of $EP_m$. This curve 76 gives the width $Z_0$ of an impulse area 69, this width substantially corresponding to the width of an impulse area 68 and also to the width of the central impulse area $ZC_{imp}$. FIG. 9C also gives the respective widths $Z_1$ and $Z_2$ of the useful energy accumulation areas. These widths $Z_1$ and $Z_2$ are defined by the maximum amplitude oscillation for the useful drive torque range supplied to the regulating device. In FIGS. 9A and 9B, curve 74 gives the angular profile of $EP_m$ approximately in the middle of area $Z1_{ac}$, while curve 75 gives the angular profile of $EP_m$ approximately in the middle of area $Z2_{ac}$. The useful accumulation areas 63 and 65 are characterized by an increasing monotone gradient of magnetic potential energy, which is substantially linear here, between areas or plateaus of lower potential energy 62, respectively 64 and higher potential energy defined here by peaks. It will be noted that the height of the peaks of outer annular path 52 may be slightly higher than the height of the peaks of inner annular path 53. Since the magnetic potential energy is correlated to magnetic structure 44, curves 74 and 75 are angularly shifted by an angular half-period $P_0/2$.

The energy transmitted to the resonator on the passage through an impulse area substantially corresponds to the difference in potential energy $\Delta EP_m$ between the point of entry $EP_{IN}1$, $EP_{IN}^2$ of the oscillating magnetic coupling element into this impulse area and the point of exit $EP_{OUT}^1$, $EP_{OUT}^2$ of this oscillating member from the impulse area. Given that all of the lower potential energy areas 62 and 64 have substantially the same constant value here and that all the oscillations within the useful drive torque range pass from a useful accumulation area 63 or 65 to a lower potential energy area, the energy transmitted to the resonator on the passage through an impulse area substantially corresponds to the difference in potential energy $\Delta EP_m$ (FIG. 9C) between point $X_1$ and point $X_2$ for an oscillation passing through point $X_1$ in projection in the general plane of the magnetic structure.

It will be noted first of all that, in conceivable variants, the increasing magnetic potential energy gradient may be not linear, but, for example, quadratic or have several segments with different slopes. Next, the lower potential energy plateaus 62, 64 respectively, may have other potential energy profiles. Thus, for example, a particular variant provides an angular profile of magnetic potential energy defining alternating rising gradients or ramps (braking ramps/potential energy accumulation areas) alternating with falling gradients or ramps. These falling gradients may extend over an angular half-period of less and thus end with a small lower plateau. They may be linear or have a different profile. Likewise, it is clear that the rising gradients may extend over an angular distance different from an angular half-period, especially lower, but also higher. There are no further limitations in this regard within the scope of the present invention other than maintaining a useful resonant mode of the resonator, and thus the presence, for this resonant mode, of impulse areas of non-zero angular length, i.e. passing areas for the oscillating coupling member, in proximity to the zero position circle, between a useful accumulation area on one side of the circle and a receiving area on the other side of the circle, these two areas being configured so that the difference in potential energy $\Delta EP_m$ is positive for the oscillating coupling member in the useful torque range between each useful accumulation area and the corresponding receiving area.

Magnetic material 45 of magnetic structure 44 is therefore arranged so that, in each angular period, at least in one area of the magnetic material corresponding to the useful magnetic potential energy accumulation area in said angular period, the considered physical parameter of the magnetic material gradually increases angularly or gradually decreases angularly so that the magnetic potential energy $EP_m$ of the oscillator, in each useful accumulation area, increases angularly during a rotation of the magnetic structure relative to the magnetic coupling element. Next, for the embodiment considered here and for any drive torque of the useful drive torque range, the magnetic coupling element passes, in each half-period of oscillation of the resonator, from a useful accumulation area of the first annular path, or second annular path respectively, to a lower or minimum potential energy area as it passes through one of the impulse areas. The magnetic structure is thus arranged so that the difference in magnetic potential energy of the oscillator between the entry of the coupling element into an impulse area and the exit of said coupling element from said impulse area is positive for any drive torque of the useful range.

Figure 3:
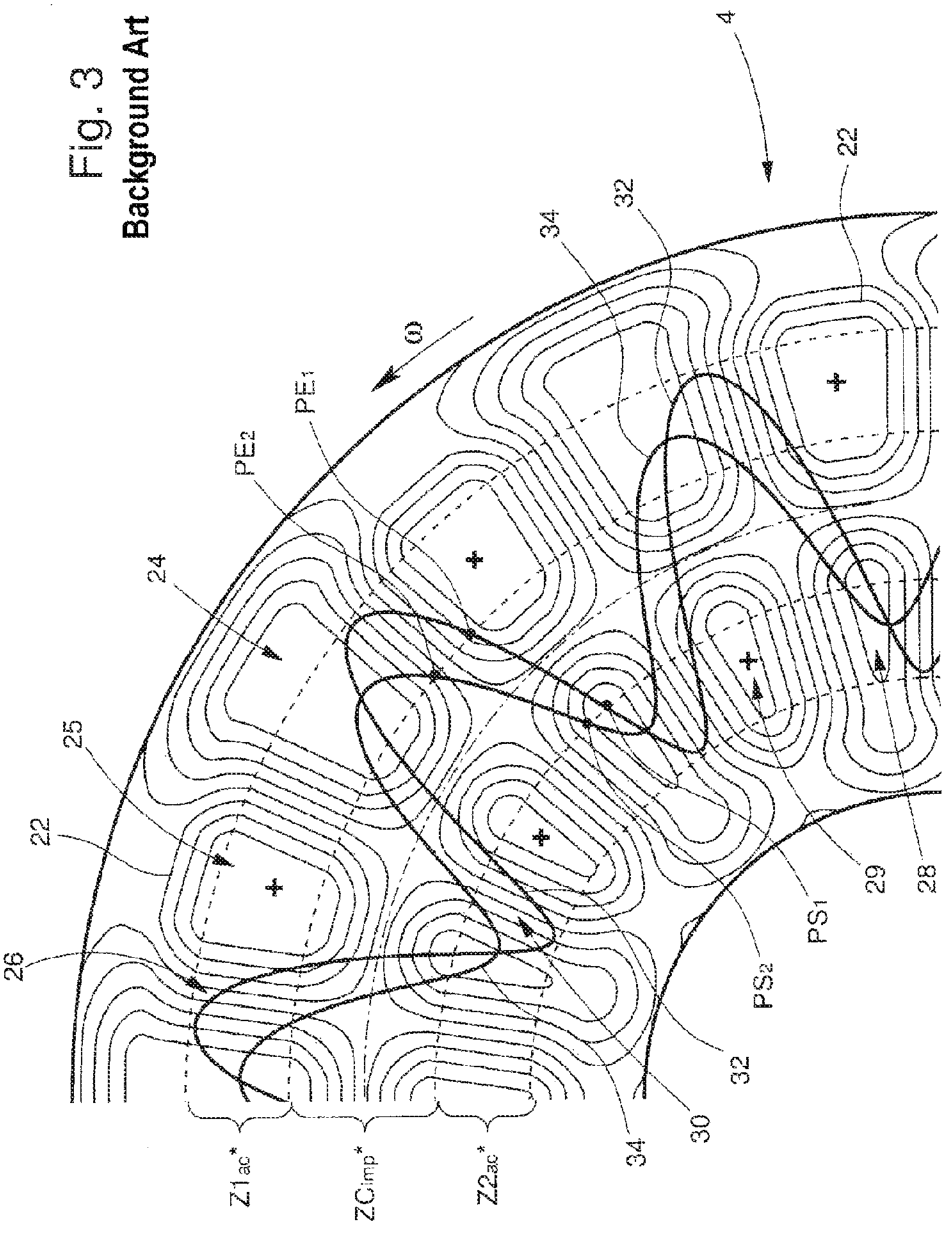
Fig. 3 Background Art
Figure 4:
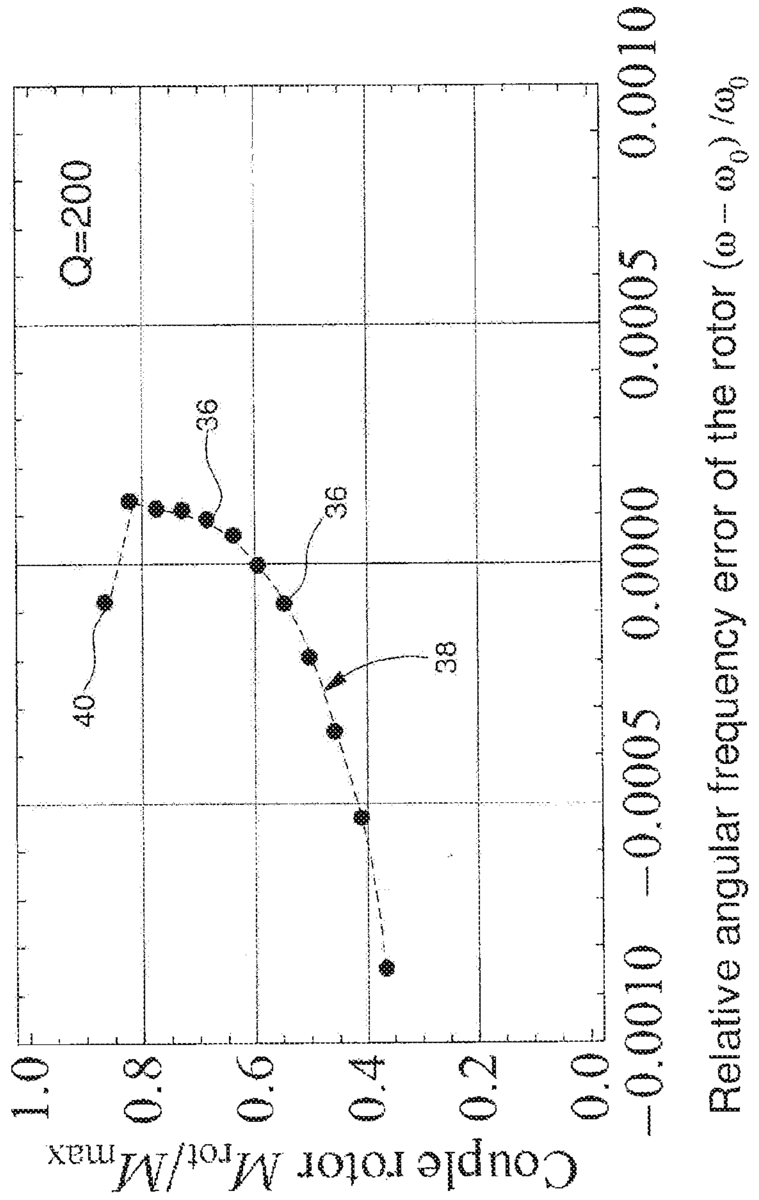
Fig. 4 Background Art
FIG. 4, already described, shows the relative angular speed error as a function of the relative torque applied to the oscillator of FIG. 1.

An examination of the differences between FIG. 8 and FIG. 3 (oscillator corresponding to an optimised background art embodiment with a coupling element whose end portion is round or square), reveals that, in FIG. 3, the angular gradient of magnetic potential energy in energy accumulation areas 26, 30 is approximately similar to the radial gradient in the central impulse area $ZC_{imp}$*. However, in FIG. 8, the angular gradient of magnetic potential energy in energy accumulation areas 63, 65 is much smaller than the radial gradient in impulse areas 68, 69; even with a coupling element whose end portion is round or square. Within the scope of the present invention, the mean angular gradient in the pure accumulation areas, defining a braking force for the magnetic structure, is significantly smaller than the mean radial gradient (more generally the mean gradient along the degree of freedom of the useful resonant mode of the resonator) in the impulse areas, this mean radial gradient defining the thrust force on magnet 50 and thus the energy transferred to the resonator in the form of localised impulses around the zero position of the magnetic coupling element (magnet 50) of the resonator. For this comparison, the mean angular gradient and the mean radial gradient are calculated in the same unit, for example in Joules per meter (J/M). Conversely, in the background art case considered, the mean radial gradient in the central impulse area is substantially equal to the mean angular gradient in the accumulation areas. In the example described in FIGS. 5 to 9, the ratio of the mean angular gradient in the energy accumulation areas to the mean radial gradient in the impulse areas is less than 30% for area $\mathbf{Z1}_{ac}$ and less than or substantially equal to 40% for area $\mathbf{Z2}_{ac}$.

Generally, the magnetic structure is arranged so that the mean angular magnetic potential energy gradient of the oscillator in the magnetic potential energy accumulation areas is lower than the mean magnetic potential energy gradient in the impulse areas along the degree of freedom of the resonator coupling element and in the same unit. In a particular variant, the ratio of the mean angular gradient to the mean gradient along the degree of freedom is less than sixty percent (60%). In a particular variant, the ratio of the mean angular gradient to the mean gradient along the degree of freedom is less than forty percent (40%).

Figure 2:
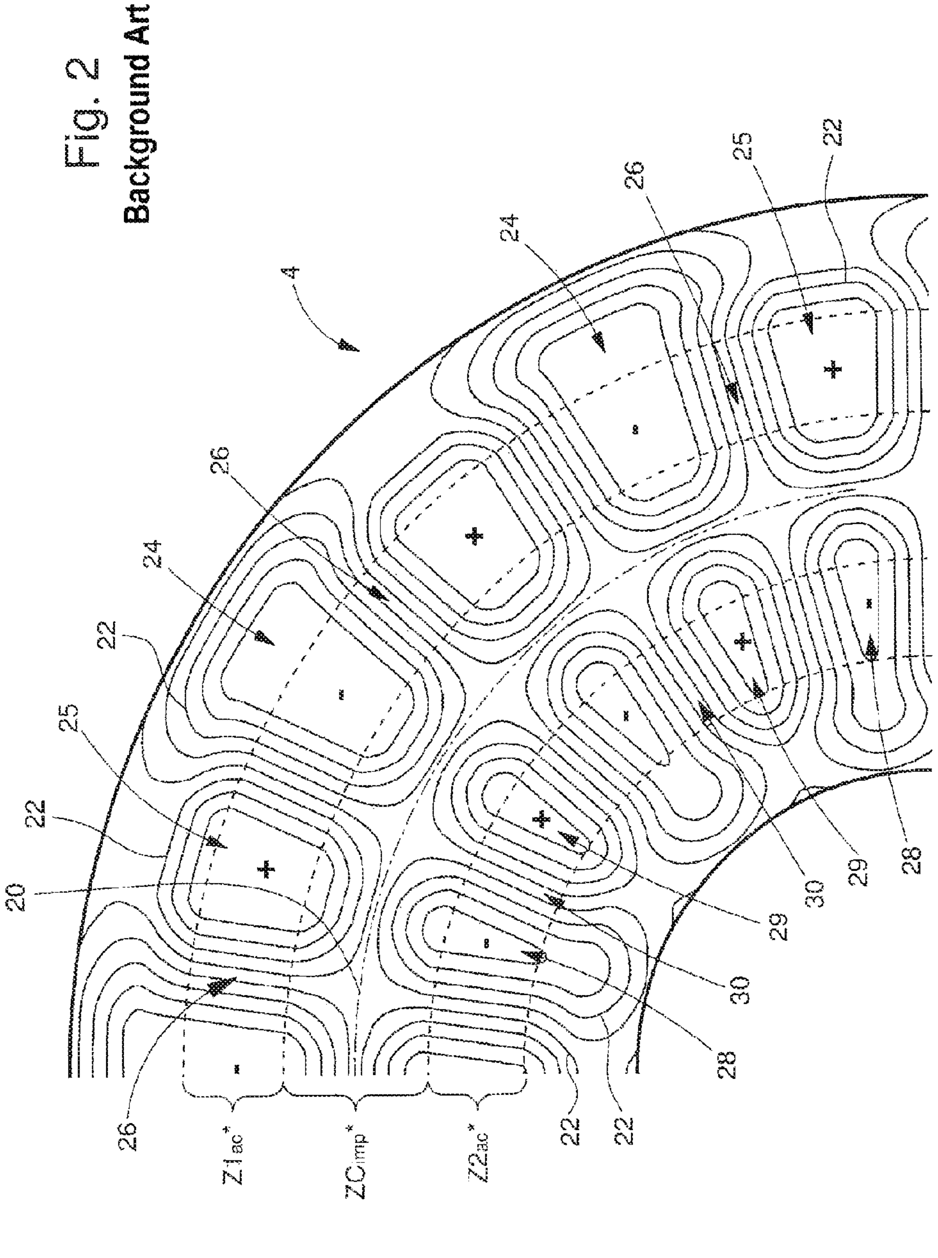
Fig. 2 Background Art
FIGS. 2 and 3, already described, show the magnetic potential energy of the regulating device of FIG. 1 and the outlines corresponding to two resonator oscillations.

It will then be noted that in FIG. 2 relating to the background art, the angular distance to pass from a maximum energy area to a minimum energy area is similar to the angular distance to pass, in a given direction, from a minimum energy area to a maximum energy area. Thus, in particular, the minimum energy areas 28 in the inner annular path are small. This is not the case in the preferred embodiments of the present invention.

In FIGS. 7 and 8, the minimum energy areas 62 and 64 extend over a relatively large angular distance and the transition from a maximum energy area to a minimum energy area is achieved over a short angular distance, much shorter than the angular distance from the preceding energy accumulation area. It will be noted that the strong gradient in the impulse areas, and therefore in the transition areas between maximum potential energy and minimum potential energy, is obtained as a result of the reduced dimensions of the coupling element, in projection in the general plane of the magnetic structure, in the radial direction of the annular magnetic paths corresponding here to the useful degree of freedom of the resonator, compared to the corresponding dimensions in the background art. It will be noted, in particular, that, in the background art, the width of the pure accumulation areas is approximately equal to the width of the central impulse area, or even smaller. This results in a small useful range for the drive torque, and the large width of the central impulse area causes a relatively significant disruption for the resonator since the transfer of energy is accomplished over a large part of each oscillation. Conversely, as a result of the characteristics of the present invention, the aforementioned averaging is not only not necessary, but it is even undesirable along the useful degree of freedom of the resonator and is therefore prevented as far as possible. In a theoretical optimum case, averaging is even dispensed with, which results in an almost non-zero and thus very restricted impulse area width. In practice, the reduction in averaging along the useful degree of freedom of the resonator is limited by technology and the fact that the magnetic field of a magnet occupies a certain volume.

The present invention is remarkable in that the absence of the averaging effect no longer results in a non-functional oscillator, since the angular distance over which each magnetic potential energy accumulation area extends is no longer determined by averaging, but by the fact that the physical parameter of magnetic material 45 concerned, in each area of this magnetic material corresponding to a useful accumulation area of $EP_m$, gradually increases angularly or gradually decreases angularly so that the magnetic potential energy of the oscillator increases angularly in the opposite direction to the direction of rotation of the magnetic structure relative to the magnetic coupling element. There is thus obtained a controlled increase in $EP_m$ distributed over a certain distance in the magnetic potential energy accumulation phases; which is important to prevent the oscillator becoming uncoupled as soon as the drive torque is relatively high and to obtain a relatively large operating range with no loss? of synchronization.

As a result of the features of the invention, independence is essentially created between the width of an impulse area and the angular distance of a useful accumulation area of $EP_m$. Thus, the impulses delivered to the resonator may be restricted close to the zero position of the magnetic coupling element, whereas the useful accumulation areas may be more extensive owing to a smaller angular potential energy gradient and therefore a gentler slope of potential energy increase as a function of angle θ. The impulses localised around the zero position of the resonator greatly improve isochronism, whereas a relatively extensive angular range $\theta_{ZU}$ for the area of accumulation of energy produced by the drive torque makes it possible to obtain a more extensive useful drive torque range and thus a larger operating range. It will be noted that localisation of the impulses is further improved if the radial dimension of the coupling member is small.

Figure 10:
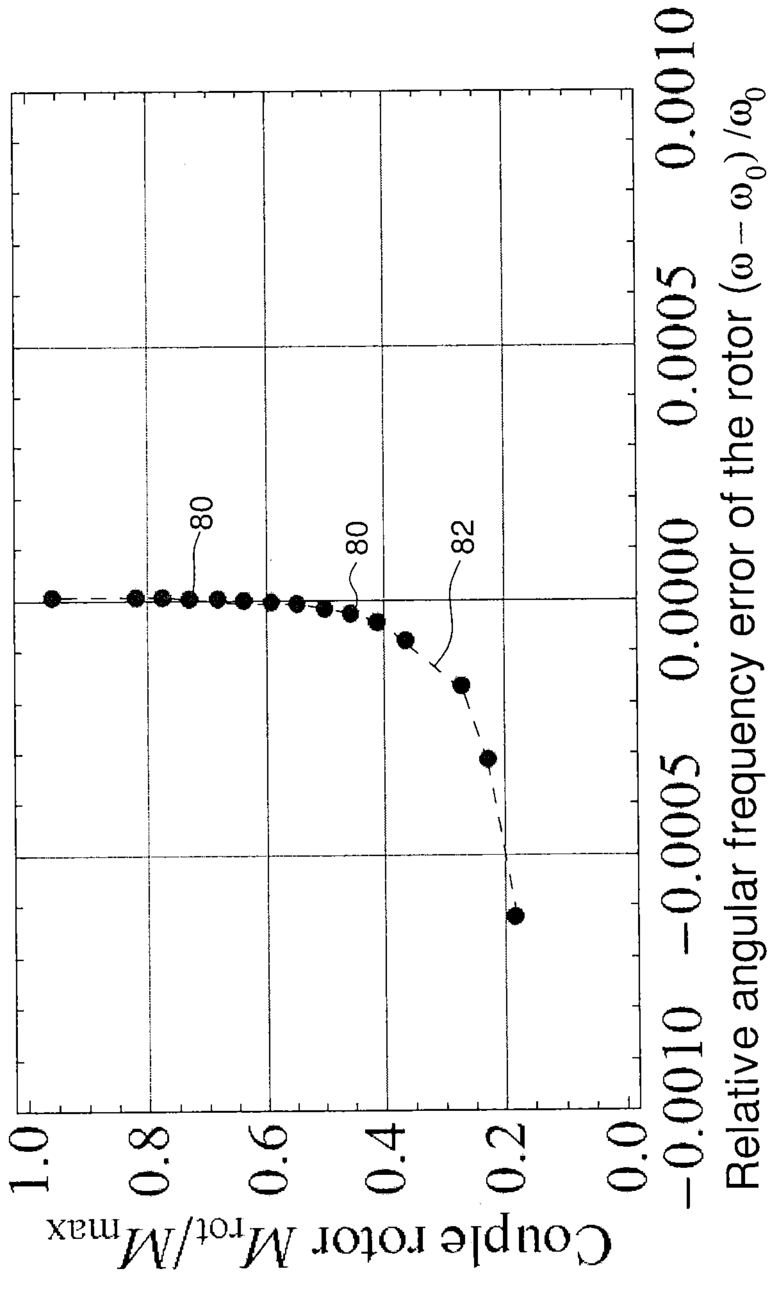
FIG. 10 shows the relative angular speed error as a function of the relative torque applied to the oscillator of FIG. 5.

The benefits of the invention appear in FIG. 10, which shows several points 80 of the relative angular speed error of a rotor carrying magnetic structure 44 as a function of the relative torque $M_{rot}/M_{max}$ delivered to the rotor (for a quality factor Q=200). There is obtained an operating curve 82 which is practically vertical above a relative drive torque of 50%. Thus, the oscillator is operational over the 50% to 100% range with very little anisochronism and, when it drops to 40%, the daily error is only approximately four seconds (4 s). Thus, these considerations shed light on the causes of the background art problems and the significant advantages flowing from the present invention.

According to a variant embodiment, the ratio between the radial dimension (width $Z_0$) of the impulse areas and the radial dimension ($Z_1$, respectively $Z_2$) of the useful accumulation areas is less than or substantially equal to fifty percent (50%). The "radial dimension" of a useful accumulation area means the maximum amplitude $A_{max}$ of oscillation of the magnetic coupling element, over one vibration for the useful maximum drive torque, less the half-width of the impulse areas, namely substantially $Z_2=Z_1=(A_{max}\ Z_0/2)$. The above ratio may also be defined by other parameters of the regulating device, for example by $Z_0/2A_{max}$ where $2A_{max}$ is equal to the distance $R_{max}R_{min}$ (peak-peak distance over one period) defined by the maximum amplitude of oscillation in projection in the general plane of the annular magnetic structure (see FIG. 8). For this first variant, the ratio $Z_0/(R_{max}R_{min})$ is thus less than or substantially equal to 20%. According to a second preferred variant, the aforementioned ratio $Z_0/Z_1$ is less than or substantially equal to thirty percent (30%).

According to a third variant embodiment, the gradual increase or decrease of the physical parameter of the magnetic material in each useful magnetic potential energy area extends over an angular distance (considered here as the angle in radians) greater than twenty percent (20%) of the angular period ($P_\theta$ in radians) of an annular path of the magnetic structure. According to a fourth preferred variant, the ratio of the angular distance of variation in the first physical parameter to the angular period is more than or substantially equal to forty percent (40%).

Figure 12:
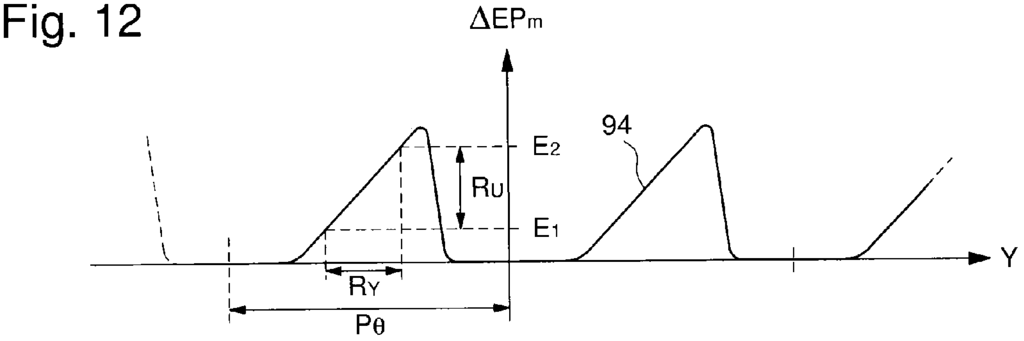
FIG. 12 shows the difference in magnetic potential energy for all the oscillations when the magnetic coupling element passes through an impulse area defined by the magnetic structure of the regulating device of FIG. 11.

With reference to FIGS. 11 and 12, there will be described below a second embodiment which is of a general nature in that the magnetic structure 86 of oscillator 84 includes a single magnetic coupling element (a magnet) and a single annular path 88 wherein a physical parameter of the magnetic material 45 forming the path varies periodically. Most of the foregoing explanation relating to the outer annular path of the first embodiment also applies to annular path 88. The characteristics of this annular path and of the magnetic potential energy associated therewith will not be described again here in detail. Magnetic structure 86 further includes a second annular path 90 continuously formed of magnetic material 45. This second path defines an annular minimum magnetic potential energy area whose value is substantially equal to that of the lower magnetic potential energy areas defined by annular sectors 52 of annular path 88. It will be noted that, in a variant, annular path 90 can be replaced by a single plate of magnetic material adjacent to annular path 88, placed underneath oscillating magnet 50 and fixed relative to resonator 46. As in the first embodiment, the zero position circle 20 of resonator 46 is located substantially at the interface $Y_0$ of the two annular paths. Circle Y substantially corresponds to the interface between the useful accumulation areas of $EP_m$ defined by annular sectors 56 and the impulse areas between these useful accumulation areas and the aforementioned annular minimum magnetic potential energy area.

The second embodiment in principle has the same benefits of the invention as those mentioned above in relation to the first embodiment. However, a single impulse per angular period $P_\theta$ of path 88 is given to the resonator, always in the same direction when the oscillating magnetic coupling element 50 passes from annular path 88 to the uniform annular path 90. The oscillation vibration above path 90 occurs with no variation in interaction between the resonator and the magnetic structure, so that the vibration is free. FIG. 12 shows the difference $EP_m$ ($\Delta EP_m$) according to the intersection of circular axis Y through the oscillating magnetic coupling element. It will be noted that curve 94 only has a practical meaning for the set of oscillations of the resonant mode concerned that can be maintained in oscillator 84. This set of oscillations is essentially located within a range $R_Y$ of circular axis Y which is determined by a useful range $R_U$ of $\Delta EP_m$, this latter range $R_U$ corresponding to the useful drive torque range delivered to magnetic structure 86.

It will be noted that, in the two embodiments described above, the radial dimension of each annular magnetic path, and thus the dimension along the degree of freedom of the resonator, is expanded, whereas the dimension of each coupling member of the resonator is radially reduced relative to the axis of rotation of the magnetic structure. In these two embodiments, the radial dimension of the annular magnetic sectors of the magnetic structure is greater than that of each coupling member of the resonator. In particular, the radial dimension of the annular magnetic sectors is chosen so that the coupling member is entirely superposed on the magnetic path concerned for maximum amplitude in the vibration where the coupling member is coupled to the magnetic path. In a preferred variant with areas of pure magnetic potential energy accumulation, it is provided that the coupling member remains in an area where the potential gradient is perpendicular to the degree of freedom of the resonator throughout the useful torque range, i.e. for all oscillation amplitudes that the coupling member may have up to the maximum amplitude.

Figure 13:
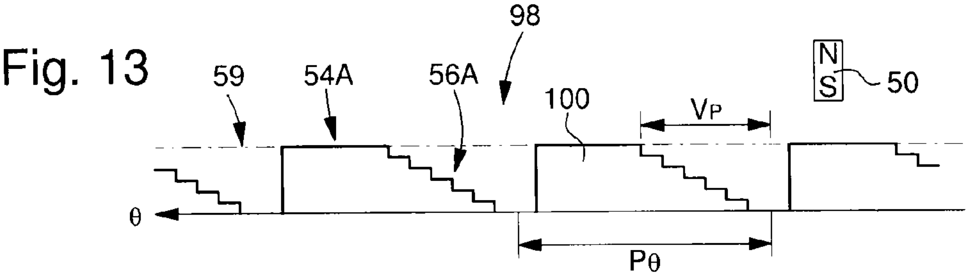
FIGS. 13, 14 and 15 are schematic views of three variants of the profile of the magnetic material along an annular path of the magnetic structure of a regulating device according to the invention.
Figure 14:
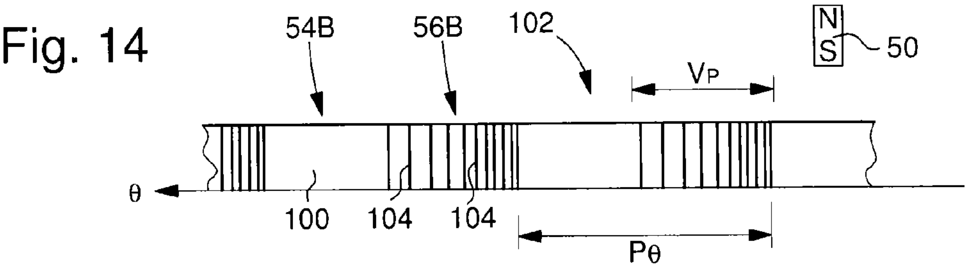
Figure 15:
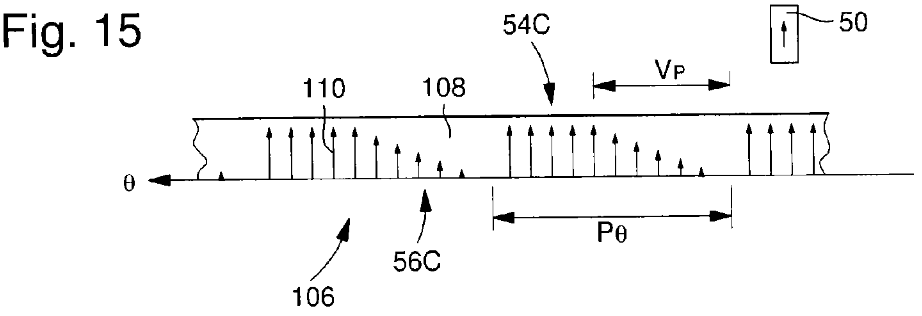

FIGS. 13 to 15 are schematic cross-sectional views of three variant embodiments of an annular path of the magnetic structure according to the invention. These variants form alternatives to the variant already described in FIGS. 6A and 6B. Annular path 98 includes alternating annular sectors 54A, where the thickness of highly magnetically permeable material 100 is constant, and annular sectors 56A, where the thickness of material 100 decreases gradually in steps over an angular distance $V_P$. Each annular sector 56A forms a stair arrangement with several steps. In this stair arrangement, the distance between the upper surface of the steps and a plane 59, parallel to the general plane of annular path 98, gradually varies in steps. This stair arrangement defines an increasing monotone potential energy gradient or ramps $EP_m$ which forms the useful potential energy accumulation areas, as explained above. The considered physical parameter of material 100 is a distance to a geometric plane 59, which corresponds to an air gap between magnet 50 and the material. In a variant, the magnetic material is formed of a magnetized material. The comments made with respect to the profiles of paths 52 and 53 concerning the contribution of the variation in thickness of the magnetic structure also apply to this latter variant, as do the comments concerning an attraction or repulsion arrangement in the variants where the coupling element and magnetic paths are formed by a magnetized material.

The annular path 102 of the variant of FIG. 14 has a constant thickness of ferromagnetic material 100, but periodically exhibits a plurality of holes 104. Annular sectors 54B without holes define the areas of minimum magnetic potential energy. Annular sectors 56B each have a plurality of holes whose density varies and/or whose section surface varies over an angular distance $V_P$. In the example shown, the density of holes, having the same relatively small diameter, increases gradually, continuously or, in a variant, in steps. The physical parameter of the ferromagnetic material here is the mean magnetic permeability of the magnetic material.

Annular path 106 of FIG. 15 is formed by a magnetized material 108 whose thickness is constant. In annular sectors 54C, the intensity of magnetic field 110 produced by the magnetized material is substantially constant. Conversely, in annular sectors 56C, the intensity of magnetic field 110 gradually decreases over an angular distance $V_P$ in an attraction arrangement (the variant shown) whereas it is arranged to increase gradually in a repulsion arrangement. In this variant, the considered physical parameter is the intensity of magnetic field flux generated by the magnetized material between the annular magnetic path and a surface of revolution having the axis of rotation of the magnetic structure as axis of revolution and the degree of freedom of magnet 50 as generatrix of this surface of revolution. A variant provides another coupling element formed of a highly magnetically permeable material (similar case to the attraction arrangement of magnetized magnets). It will be noted that using magnetic repulsion has the advantage of preventing magnet 50 from adhering to annular path 106 in the event of a shock.

Figure 16:
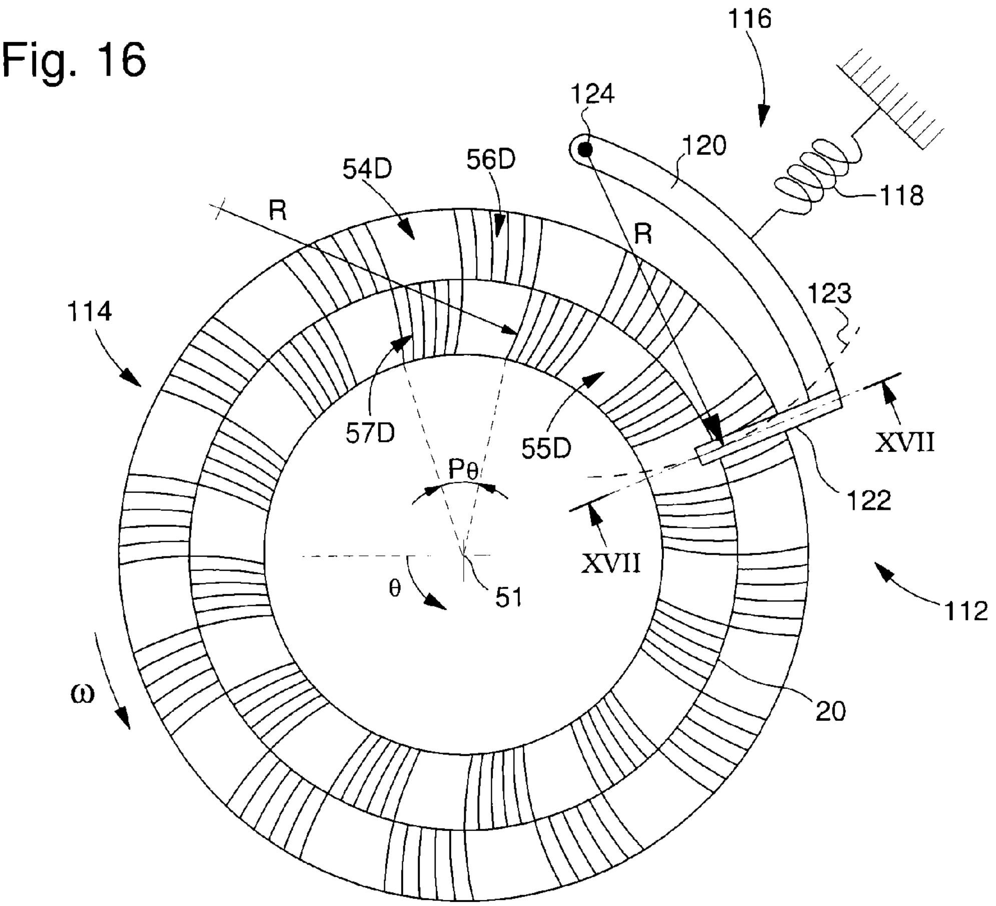
FIGS. 16 and 17 are respectively a schematic top view and a partial transverse cross-section of a third embodiment of the invention.
Figure 17:
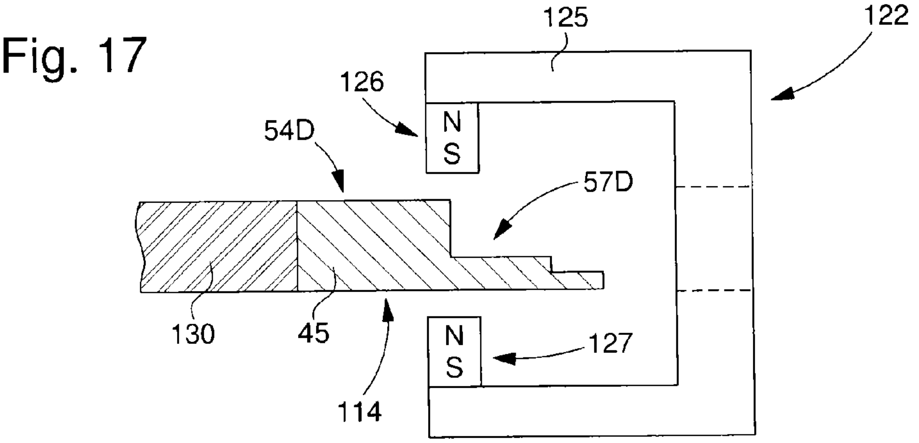

FIGS. 16 and 17 show a third embodiment of a regulating device according to the invention. It differs from the first embodiment mainly in the following characteristics. Oscillator 112 includes a resonator 116 formed by an arm or lever 120 connected to a fixed point by a linear spring 118. The arm or lever 120 rotates at a first end about an axis 124, parallel to the axis of rotation 51 of magnetic structure 114, and carries at the second end thereof a magnetic coupling element 122 coupled to magnetic structure 114. Structure 122 includes a member 125 made of ferromagnetic material, in the form of a U on its side or a C, whose two branches respectively extend above and below magnetic structure 114. At the respective free ends of the two branches are respectively arranged two magnets 126 and 127, which are oriented so that the two magnetic fields propagating in the air gap between them are mainly oriented parallel to axis of rotation 51 and in the same direction. These two coaxial magnets define together the magnetic coupling element of oscillator 112. The degree of freedom of the resonator is on a circle 123 of radius R and centred on axis of rotation 124 of the arm or lever 120, R being the distance between the axis of rotation and a geometric axis passing through the middle of the two magnets 126 and 127.

In order to obtain, according to a preferred variant of the invention, a substantially zero magnetic potential energy gradient $EP_m$ along the degree of freedom 123 of resonator 116 in the useful accumulation areas, it is provided, in this third embodiment, that the physical parameter of magnetic material 45 correlated to $EP_m$ is substantially constant in arcs of a circle corresponding to circle 123. In other words, for every angular position θ of magnetic structure 114, the considered physical parameter is invariant on the path taken by the centre of mass of the end portions of magnets 126 and 127 in projection in the general plane of the magnetic structure. This is especially the case of sectors 56D and 57D where the physical parameter varies angularly to define the useful areas of potential energy accumulation. Thus, annular sectors 54D and 56D, respectively 55D and 57D forming the two annular paths of the magnetic structure, have a slightly arched shape. The various variants mentioned for the first embodiment also apply to this third embodiment. The variant shown here is that of a stair arrangement of several steps in sectors 56D and 57D.

Figure 18:
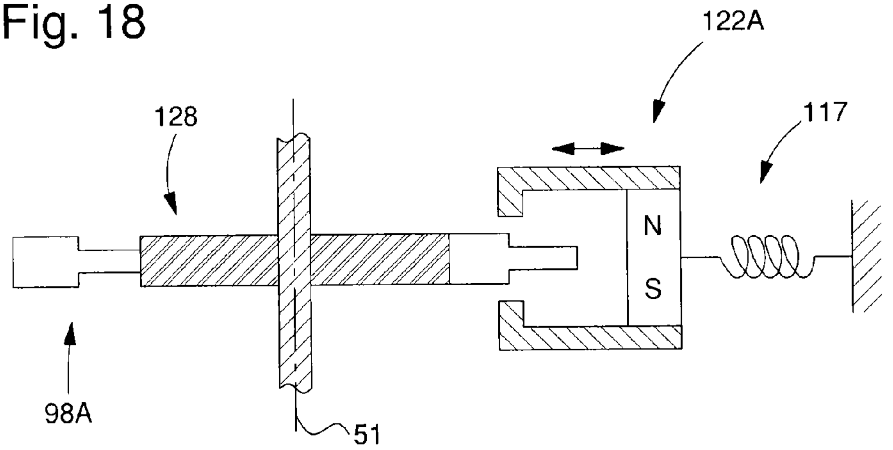
FIGS. 18 and 19 are cross-sections of two variant embodiments of the regulating device according to the invention.
Figure 19:
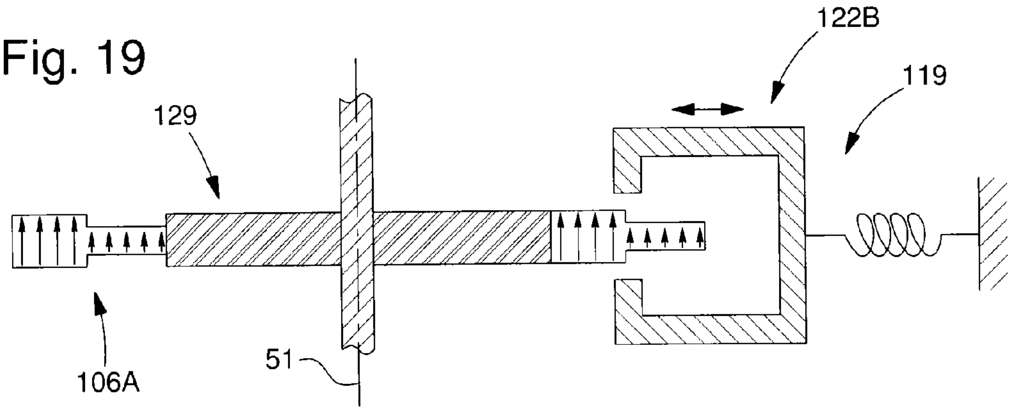
Figure 20:
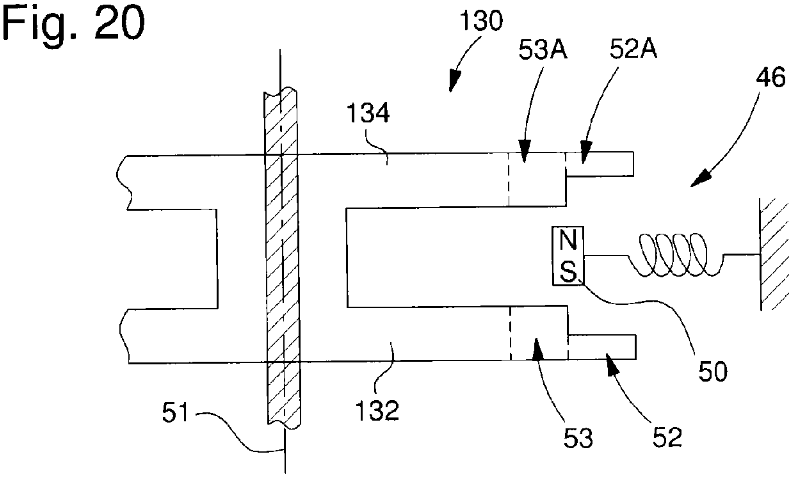
FIGS. 20 and 21 are cross-sections of two other variant embodiments of the regulating device according to the invention wherein the magnetic structure has two superposed plates between which the magnetic resonator coupling element passes.

With reference to FIGS. 18 to 20, three variant embodiments of an oscillator according to the invention will be briefly described below. The oscillator of FIG. 18 is formed by a wheel 128 including, at the periphery thereof, an annular magnetic structure 98A, similar to magnetic structure 98 (FIG. 13) in a top plane view, but doubled relative to said magnetic structure 98 by plane symmetry on circular axis e of FIG. 13. Thus, each annular sector 56A includes a first stair arrangement and beneath it, another stair arrangement, which mirrors the first stair arrangement. Wheel 128 includes a central core made of non-magnetic material. Resonator 117 includes a magnetic coupling structure 122A in a C-shape, similar to the structure 122 described above. However, here, structure 122A includes a large magnet connected to two branches of ferromagnetic material whose respective two free ends define together the element magnetically coupling the resonator to magnetic structure 98A.

In FIG. 19, the oscillator includes a wheel 129 formed of a central core of non-magnetic material and an annular magnetic structure 106A. This structure 106A is functionally similar to magnetic structure 106 of FIG. 15, but here the material is homogeneously magnetized throughout magnetic structure 106A; the variation in intensity of the magnetic field generated by the magnet and thus in the coupled magnetic flux is obtained by a variation in the thickness of the magnetized ring. Resonator 119 is remarkable in that it contains no magnets, its magnetic coupling structure 122B being formed by an open loop of highly magnetically permeable material, the magnetized structure 106A passing through the opening in the loop. Loop 122B simply defines a path of low magnetic reluctance for the magnetic field of the magnetized structure. In another variant, wheel 129 can be combined with the magnetic coupling structure 122A (in attraction or repulsion) of FIG. 18.

In FIG. 20, the oscillator is distinguished by a rotor 130 formed of two plates 132 and 134 of ferromagnetic material. Lower plate 132 has, at the periphery thereof, a magnetic structure with two annular paths 52 and 53 like those already described and formed by the ferromagnetic material. Top plate 134 is similar to the bottom plate but is inverted, i.e. it is the image of the bottom plate by plane symmetry through the middle plane between the two plates. This top plate therefore includes two annular paths 52A and 53A similar to annular paths 52 and 53 and opposite the latter. These two plates are joined in the central region to form a low magnetic reluctance path for the magnetic field of magnet 50 of resonator 46. It will be noted that the variants shown in FIGS. 18 and 20 have the advantage of preventing a force being axially applied to the resonator coupling element.

Figure 21:
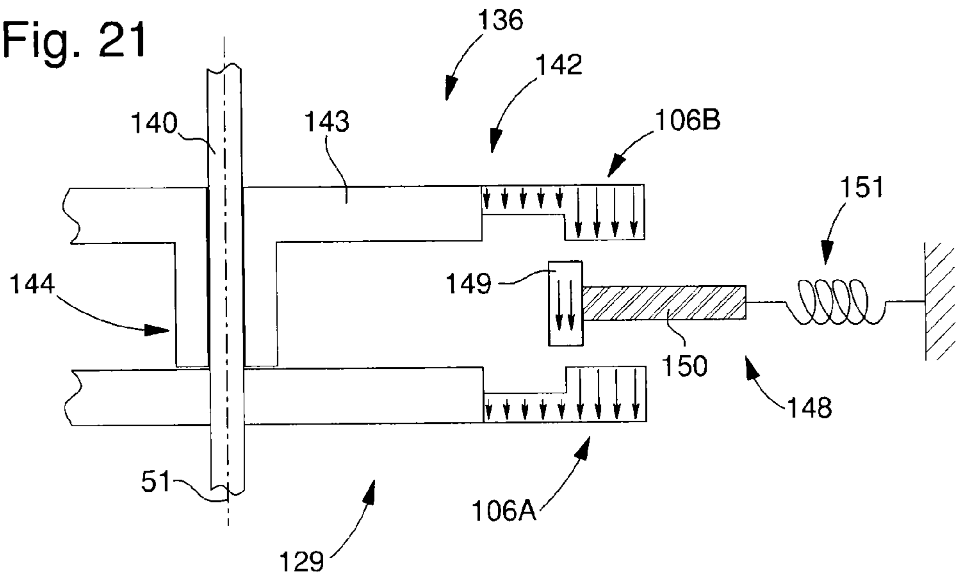

FIG. 21 shows another yet another variant embodiment of a regulating device 136 according to the invention. This device is remarkable in that it includes two magnetic structures 106A and 106B which are coaxial and mechanically independent (not integral in rotation via mechanical means). The lower magnetic structure 106A is carried by a wheel 129 similar to that described in FIG. 19, this wheel being integral with an arbor 140 aligned on axis of rotation 51. The top wheel 142 is formed of a central core 143 of non-magnetic material connected to a pipe 144 freely mounted about arbor 140, and of a magnetic structure 106B similar to structure 106A, but the image thereof by planar symmetry relative to the middle plane between the two wheels. Resonator 148 is represented by a spring 151 and a magnetic coupling element 149 of ferromagnetic material arranged at the end of an arm 150 of non-magnetic material. Magnetisation is arranged in the same direction in the two structures 106A and 106B. In a first variant, the two wheels 129 and 142 are respectively driven by the same mechanical energy source, in particular a mainspring. In a second variant, these two wheels are respectively driven by two different mechanical energy sources, in particular two barrels arranged in a timepiece movement. The other variants described above for the magnetic structure may also be provided here. It will also be noted that the magnetic coupling element may also be a magnet.

Figure 22:
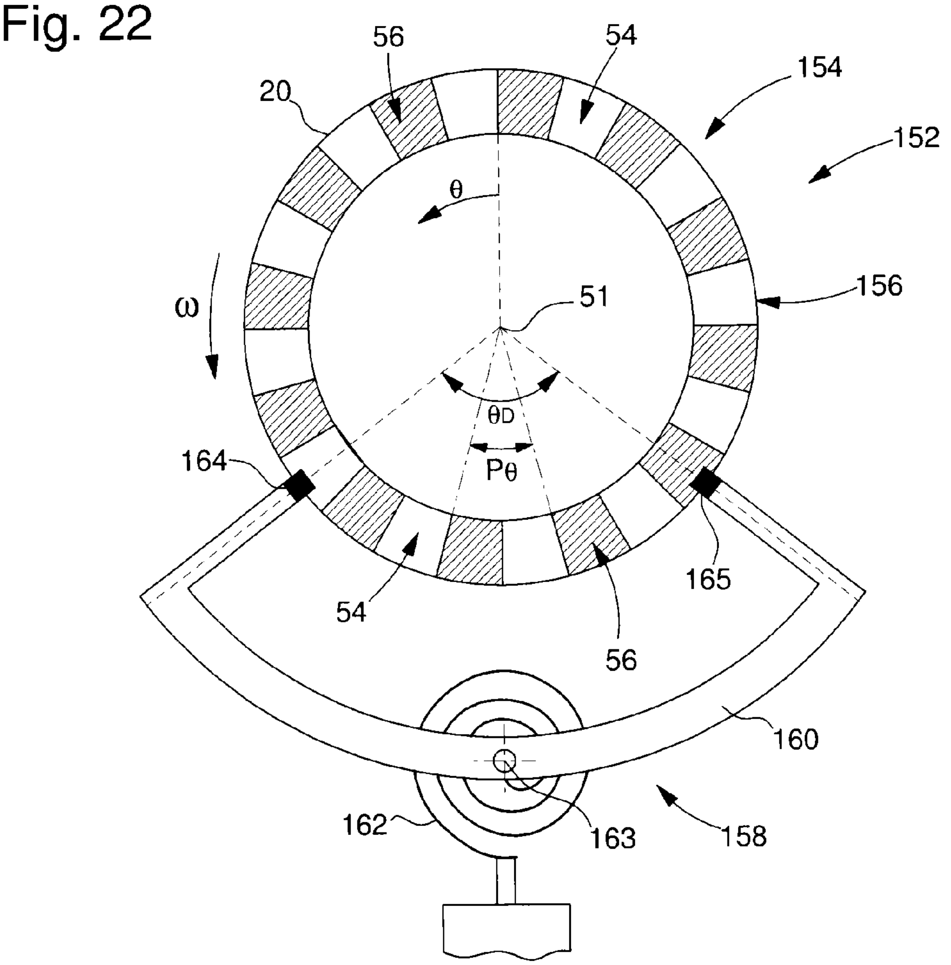
FIG. 22 is a schematic top view of a fourth embodiment of a regulating device according to the invention.

FIG. 22 shows a fourth embodiment of a regulating device 152 according to the invention. This embodiment differs notably in that the magnetic structure 154 includes a single annular path 156 formed by alternating annular sectors 54 and 56 as described above. It will be noted that, in this embodiment and in the embodiments set out below, as in the previously described embodiments, the non-hatched sectors correspond to lower or minimum magnetic potential energy areas, whereas the hatched sectors correspond to areas in which magnetic potential energy increases angularly according to the invention. In these hatched sectors, the magnetic material used has at least one physical parameter which is correlated to the magnetic potential energy of the oscillator when the magnetic resonator coupling element is magnetically coupled to the annular magnetic path. The magnetic material in each hatched sector is arranged so that the physical parameter in question gradually increases angularly or gradually decreases angularly so that the magnetic potential energy of the oscillator increases angularly during the intended relative rotation between the resonator and the magnetic structure. It will also be noted that, in this embodiment, and in the embodiments explained below with the exception of the eighth embodiment, the magnetic material is arranged in the hatched sectors so that the physical parameter in question is radially constant, but gradually varies angularly to ensure a gradual accumulation of magnetic potential energy over a relatively extensive angular braking distance which depends on the oscillation amplitude of the resonator coupling element.

Resonator 158 is of the sprung balance type with a rigid balance 160 associated with a balance spring 162. The balance may take various shapes, especially circular as in a conventional timepiece movement. The balance pivots about an axis 163 and includes two magnetic coupling members 164 and 165 (magnets of square cross-section) which are angularly shifted relative to the axis of rotation 51 of magnetic structure 154. The angular shift of the two magnets 164 et 165 and their position relative to structure 154 are arranged such that the two magnets are on zero position circle 20 of the resonator when the latter is at rest (non-excited) and they then have an angular shift $\theta_D$ equal to an integer angular period number $P_\theta$ increased by a half-period. Thus these two magnets present a phase shift of $\pi$. Circle 20 substantially corresponds to the outer limit of the annular path 156 or, in a variant, to the inner limit of this annular path. Preferably, axis of rotation 163 of the balance is positioned at the intersection of the two tangents to zero position circle 20, respectively to the two points defined by the two coupling members 164 and 165 on the zero position circle. It will be noted that it is preferable for the balance to be poised, more specifically for its centre of mass to be on the balance axis. Those skilled in the art will easily be able to configure balances of various shapes having this important characteristic. It will thus be understood that the different variants shown in the Figures are schematic and the problem of resonator inertia is not addressed in concrete terms in these Figures, which show the various characteristics of the invention. Moreover, arrangements guaranteeing a zero resultant magnetic force acting radially and axially on the balance staff are preferred. It will be noted that, in a variant, there is provided a balance with flexible strips defining a virtual axis of rotation, i.e. with no pivoting, instead of the sprung balance.

It will be noted that, as a result of the presence of the two magnetic coupling members, resonator 158 is continuously magnetically coupled to annular path 156 by one or other of these two members. In each balance oscillation period, the balance receives two impulses. The physical phenomenon generating these impulses is the same as that described above taking into account the two magnets and the annular path. Indeed, when one magnet climbs a potential energy gradient or ramp in an annular sector 56 and returns in the direction of circle 20, the other magnet reaches a position above an annular sector 54 whose potential energy is minimum. It is thus the combined effect of the two interactions which occurs in this embodiment. In a variant embodiment, a simple ring of highly magnetically permeable material, in a similar manner to the second embodiment, is arranged outside and adjacent to annular path 156. This simple ring thus defines, over its entire surface, the same lower potential energy for the oscillator. The ring may therefore be integral with magnetic structure 154 or fixedly arranged relative to resonator 158. In this latter case, two ferromagnetic plates, respectively arranged in the two radial directions of the two resonator magnets relative to axis 51, are sufficient for the function.

Figure 23:
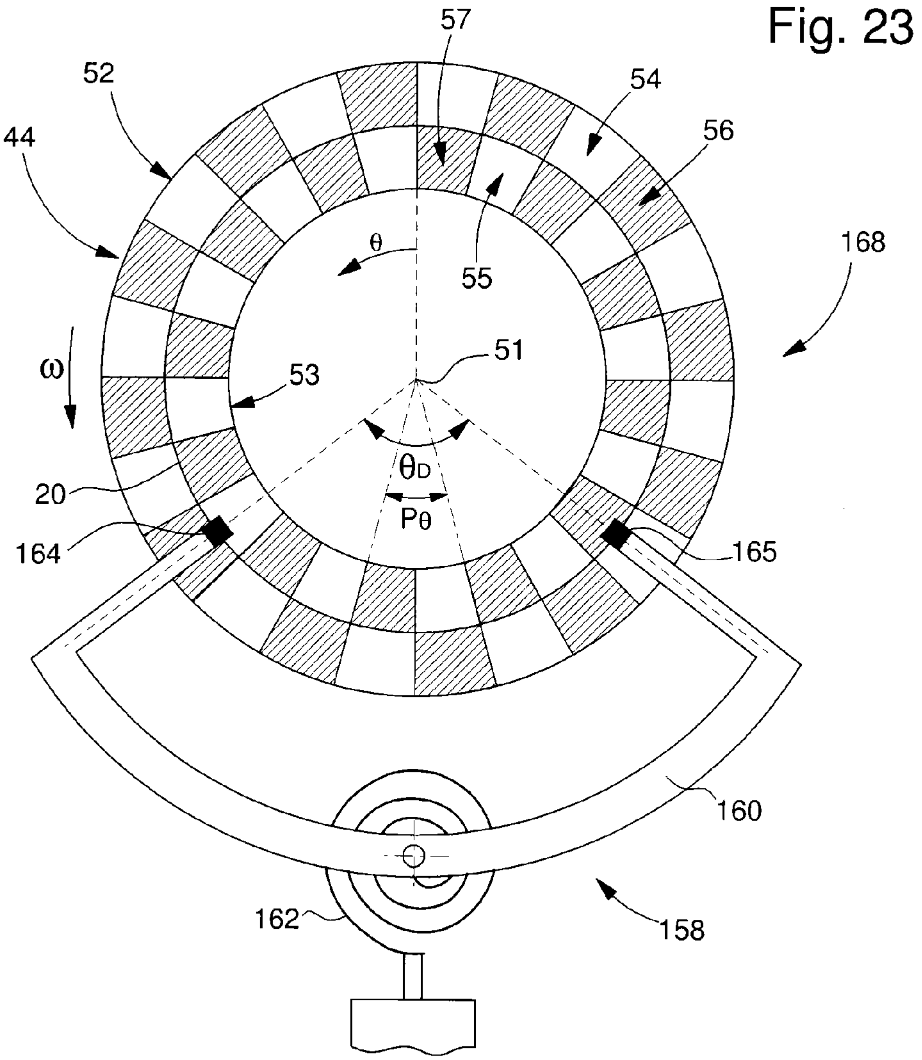
FIG. 23 is a schematic top view of a variant of the fourth embodiment of a regulating device according to the invention.

FIG. 23 also shows another variant embodiment wherein the regulating device, formed by oscillator 168, includes a magnetic structure 44 already described above and a resonator 158 described above. This variant differs from that of FIG. 22 in the arrangement of a second annular path 52 in addition to annular path 53 corresponding to annular path 156. As a result of this arrangement, each of magnets 164 and 165 receives an impulse when passing into the central impulse area. There is therefore a double impulse here, whereas the variant of FIG. 22 only receives one impulse overall. The variant of FIG. 23 is particularly efficient and has a relatively extensive operating range. Consequently, this embodiment exhibits a doubling of the magnetic coupling between the resonator and the magnetic structure compared to the variant of FIG. 22 and to the first embodiment; as is also the case in the two embodiments set out above.

Figure 24:
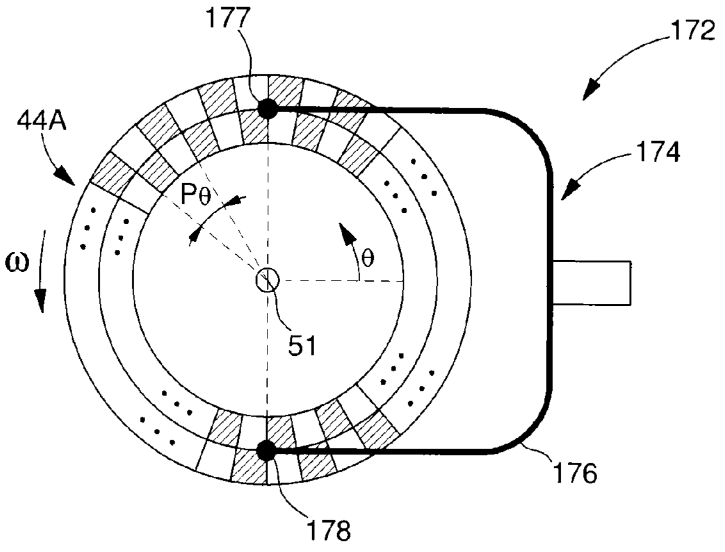
FIGS. 24 and 25 are schematic views of the fifth and sixth embodiments of the invention.

FIG. 24 shows a fifth embodiment of the invention. Oscillator 172 includes a magnetic structure 44A similar to structure 44 described above and including an even number of angular periods $P_\theta$. Resonator 174 is formed by a tuning fork 176 with two vibrating branches. The two respective free ends of the two branches respectively carry two cylindrical magnets 177 and 178 diametrically opposite relative to axis of rotation 51. The reason for this choice of an even number of angular periods $P_\theta$ is linked to the fact that, in the fundamental resonant mode of the tuning fork, the two branches oscillate in phase opposition, i.e. in opposite directions. Each resonator magnet experiences an interaction with magnetic structure 44A which is similar to that described in relation to the first embodiment. Thus, each magnet contributes to the maintenance of oscillation and therefore to the maintenance of the vibration of tuning fork 176.

Figure 25:
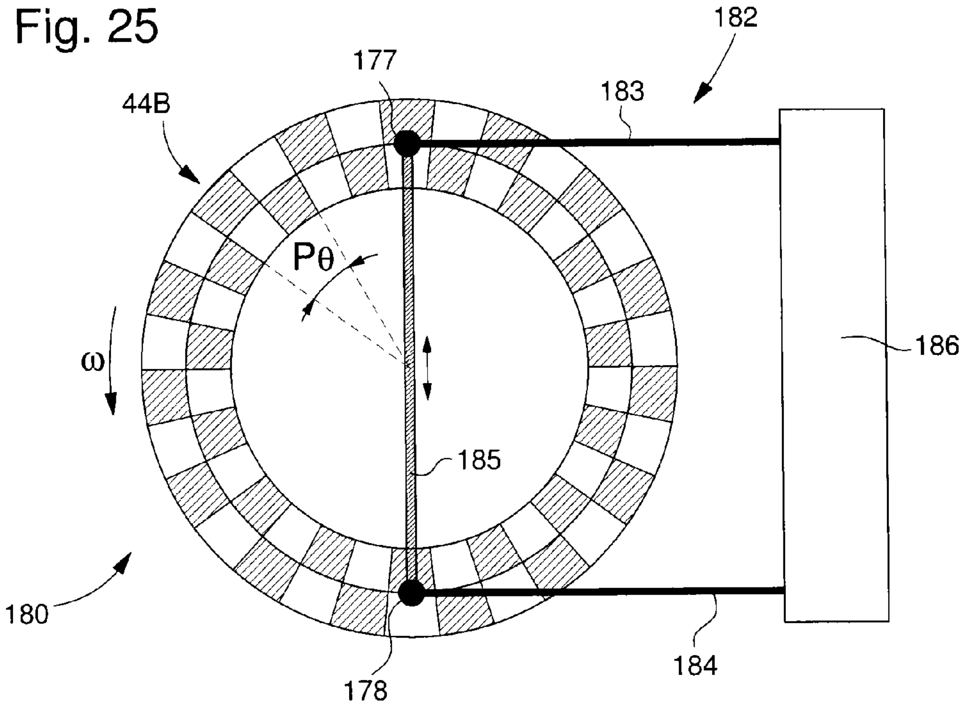

FIG. 25 shows a sixth embodiment of the invention. Oscillator 180 mainly differs from the preceding oscillator in that the two magnets 177 and 178 of resonator 182 are rigidly connected by a bar 185, and in that magnetic structure 44B includes an odd number of angular periods $P_\theta$. Each magnet is arranged at the end of an elastic pin 183, respectively 184 anchored in a base 186. In a variant, a tuning fork can be used as in FIG. 24 with the two rigidly connected magnets. Thus, the useful resonant mode of resonator 182 defines an in-phase oscillation of the two magnets due to the rigid connection between them. This is reason why magnetic structure 44B includes an odd number of angular periods $P_\theta$ here. Each resonator magnet experiences an interaction with magnetic structure 44B which is similar to that described in relation to the first embodiment. Thus, each magnet contributes to the maintenance of oscillation of the corresponding elastic pin, and thus to the maintenance of vibration of resonator 182.

Figure 26:
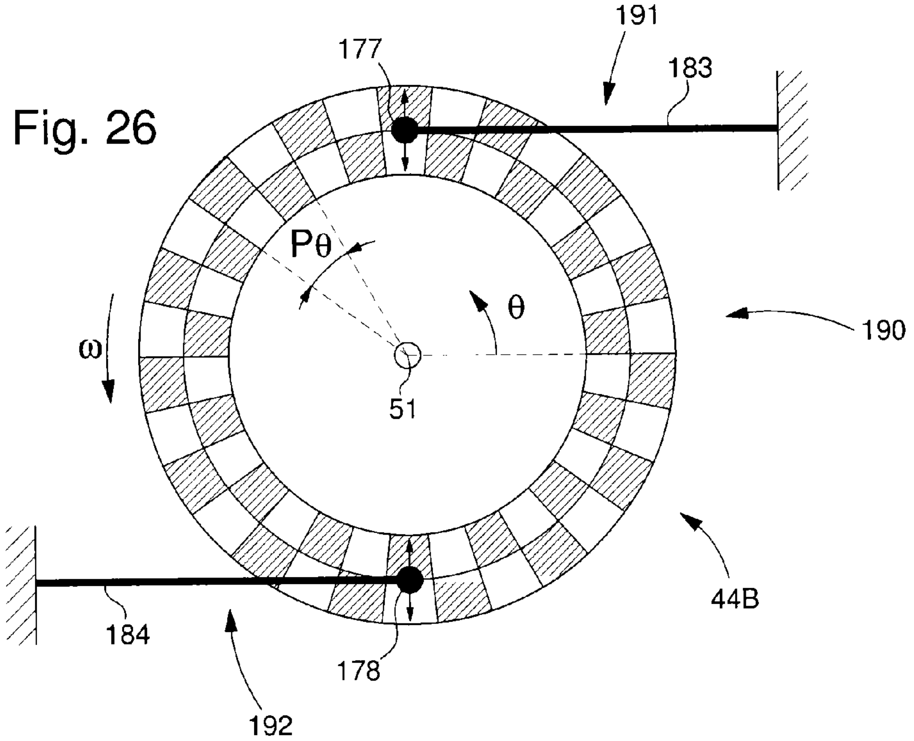
FIG. 26 is a schematic top view of a seventh embodiment including two independent resonators.

FIG. 26 shows a seventh embodiment of a regulating device 190 according to the invention. This embodiment is particular and advantageous in that it includes a magnetic structure 44B magnetically coupled to two resonators 191 and 192 which are independent of each other except for the magnetic coupling via the magnetic structure. Each resonator is schematically represented by an elastic pin 183, respectively 184 anchored at a first end and carrying a magnet 177, respectively 178. Each resonator thus has its own natural frequency. There is, therefore, a kind of averaging of the two natural frequencies for the angular speed ω of the wheel integral with magnetic structure 44B, the latter having an additional differential function. Evidently, the two selected natural frequencies must be close, or even substantially equal. However, it is may be envisaged that the two oscillators react differently to the surrounding conditions, preferably so that one compensates for the drift of the other when the surrounding conditions vary. It will be noted that the two oscillators are oriented in opposite directions, so as to compensate for the effect of gravity in their direction. In a variant, two other resonators are provided, also oriented in opposite directions in a direction perpendicular to the two resonators shown in FIG. 26, so as to compensate for the effect of gravity in this perpendicular direction.

Figure 27:
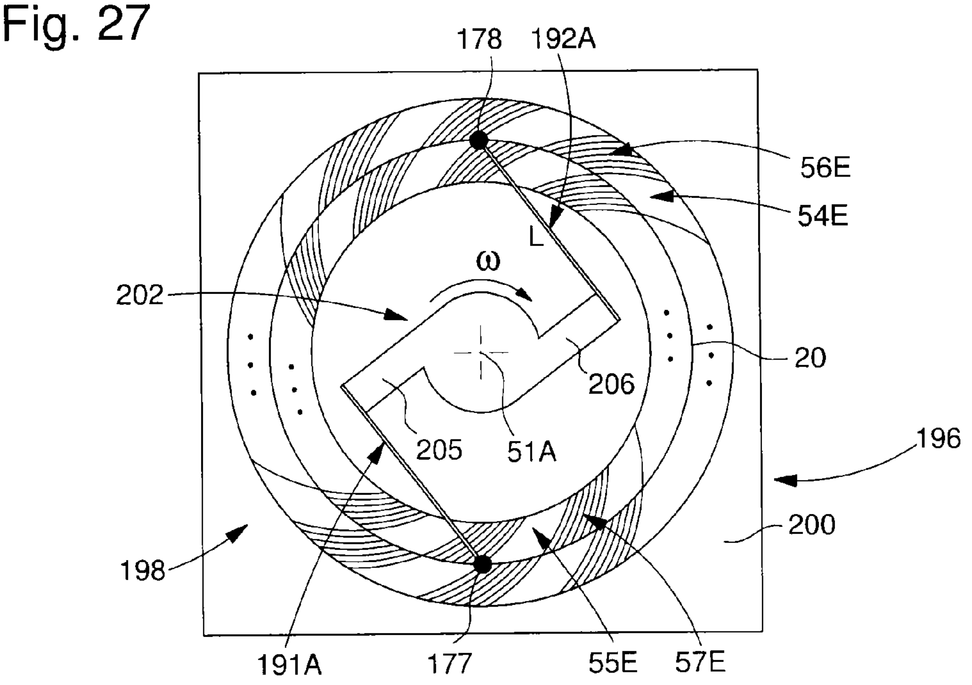
FIG. 27 is a schematic top view of an eighth embodiment wherein the resonator is driven in rotation.

FIG. 27 shows an eighth embodiment of the invention. Regulating device 196 differs mainly from the preceding embodiments in two specific aspects. First of all, magnetic structure 198 is fixedly arranged on a support or a plate 200, whereas the two oscillators 191A and 192A are driven in rotation at angular speed ω by a drive torque provided to a rotor 202 which includes two rigid arms 205 and 206 at whose respective free ends the two oscillators are respectively arranged. It will be noted that this inversion as to the device to which the drive torque is applied does not in any way change the magnetic interaction between the resonator(s) and the magnetic structure(s) explained above, so that this inversion may be implemented as a variant of the other embodiments. It will be noted that two resonators are provided here, each defining an oscillator with magnetic structure 198. However, in another variant (not shown), a single resonator is provided.

The second specific aspect of this embodiment originates from the fact that the oscillation is not radial, relative to the axis of rotation 51A of rotor 202, when magnet 177, respectively 178, intercepts zero position circle 20. As in several embodiments described above, the degree of freedom of the coupling element of each resonator is located substantially on the circle whose radius is substantially equal here to the length L of the elastic pin of the resonator and centred at the point of anchorage of the pin on the resonator arm. In order to obtain, according to a preferred variant of the invention, a substantially zero magnetic potential energy gradient $EP_m$ along the degree of freedom of each resonator (the two resonators having axial symmetry about a geometric axis 51A) in the useful accumulation areas of $EP_m$, this embodiment provides that the physical parameter of the magnetic material of magnetic structure 198 is substantially constant in arcs of a circle corresponding to the geometric circle defined by the coupling elements. In other words, for every angular position of rotor 202, the considered physical parameter is invariant on the path taken by magnets 177 and 178 in projection in the general plane of the fixed magnetic structure. This is especially the case of sectors 56E and 57E where the physical parameter varies to define useful of accumulation of $EP_m$. It will be noted that annular sectors 54E and 56E, respectively 55E and 57E forming the two annular paths of the magnetic structure have an arched shape, the alternating sectors of the inner annular path being slightly angularly shifted with respect to the sectors of the outer annular path.

Figure 28:
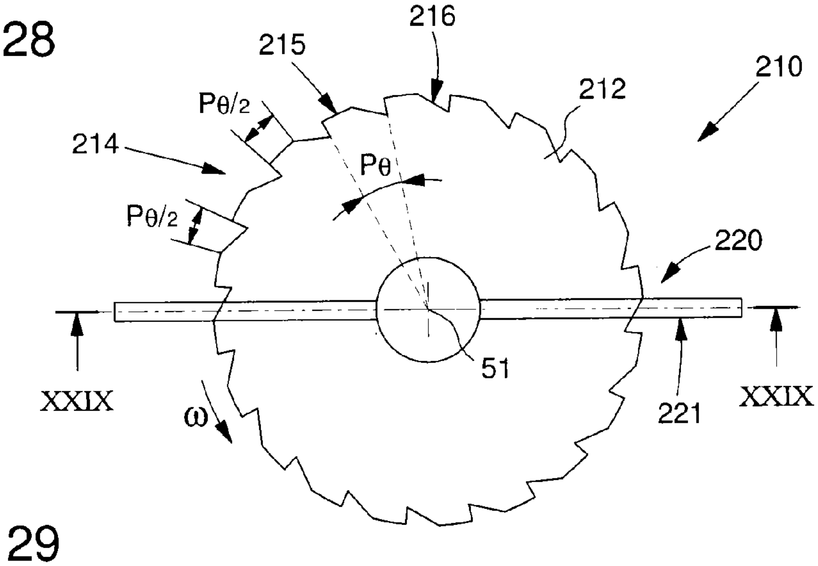
FIGS. 28 and 29 are respectively a schematic top view and a transverse cross-section of a ninth embodiment of the invention.
Figure 29:
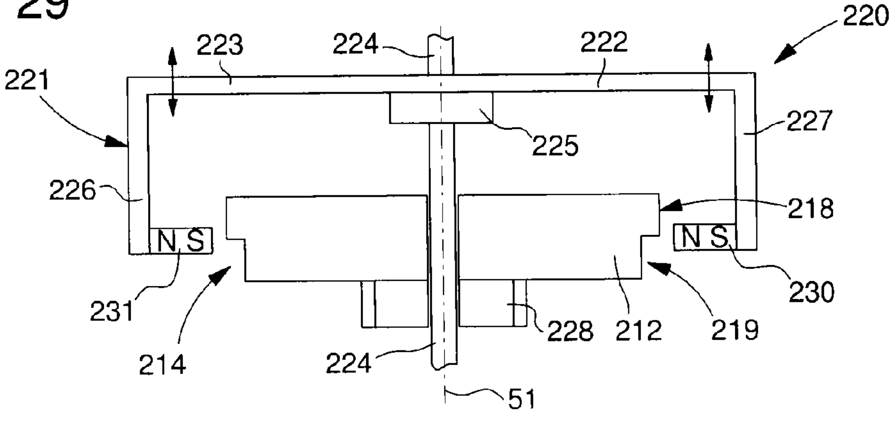

FIGS. 28 and 29 show plan and cross-sectional views of a ninth embodiment of a regulating device according to the invention. Oscillator 210 includes a wheel 212 of which at least the peripheral annular part is formed of a highly magnetically permeable material. The lateral surface of this wheel is configured to form a cylindrical magnetic structure 214. This magnetic structure remains annular, but extends axially and no longer in the general plane of the wheel. In the other embodiments, the magnetic coupling between the resonator and the magnetic structure is axial in direction (the main component is parallel to the axis of rotation), whereas here the magnetic coupling is radial. Structure 214 defines two cylindrical paths 218 and 219 equivalent to the annular paths described above. Thus, the essential considerations for the preceding embodiments also apply to various possible variants of this embodiment. In the variant shown, each path is formed by a series of asymmetrical teeth which define the angular period $P_\theta$ of the magnetic structure. Each tooth has a flat portion or a small cylindrical section 215 followed by a hollow forming a ramp/inclined plane 216. The teeth of the lower path 219 are angularly shifted by a half-period $P_\theta/2$ relative to the teeth of the upper path 218. This magnetic structure acts in a similar manner to that explained in the other embodiments for resonator 220. This resonator includes a light structure 221 preferably made of ferromagnetic material. This structure 221 includes two elastic arms 222 and 223 arranged diametrically relative to an arbor 224 centred on axis of rotation 51 of wheel 212. The resonator is fixedly mounted on the arbor, structure 221 being fixed to a disc 225 integral with the arbor. The two elastic arms are respectively extended at their free ends by two axial branches 226 and 227 which respectively carry magnets 230 and 231 at their lower ends. These two magnets are arranged so that the magnetic field generated by each of them is mainly radial. It is arranged to use a resonance wherein the two elastic arms 222 and 223 vibrate axially, which causes an axial oscillation of magnets 230 and 231. For the wheel to rotate independently of the resonator, a central hole is provided in wheel 212 through which the arbor passes freely. It will also be noted that the wheel is integral with a pinion 228 used for driving the wheel by a drive torque originating, for example, from a mainspring. Other resonators may be provided by those skilled in the art with wheel 212, particular a type of resonator operating in torsion.

Figure 30:
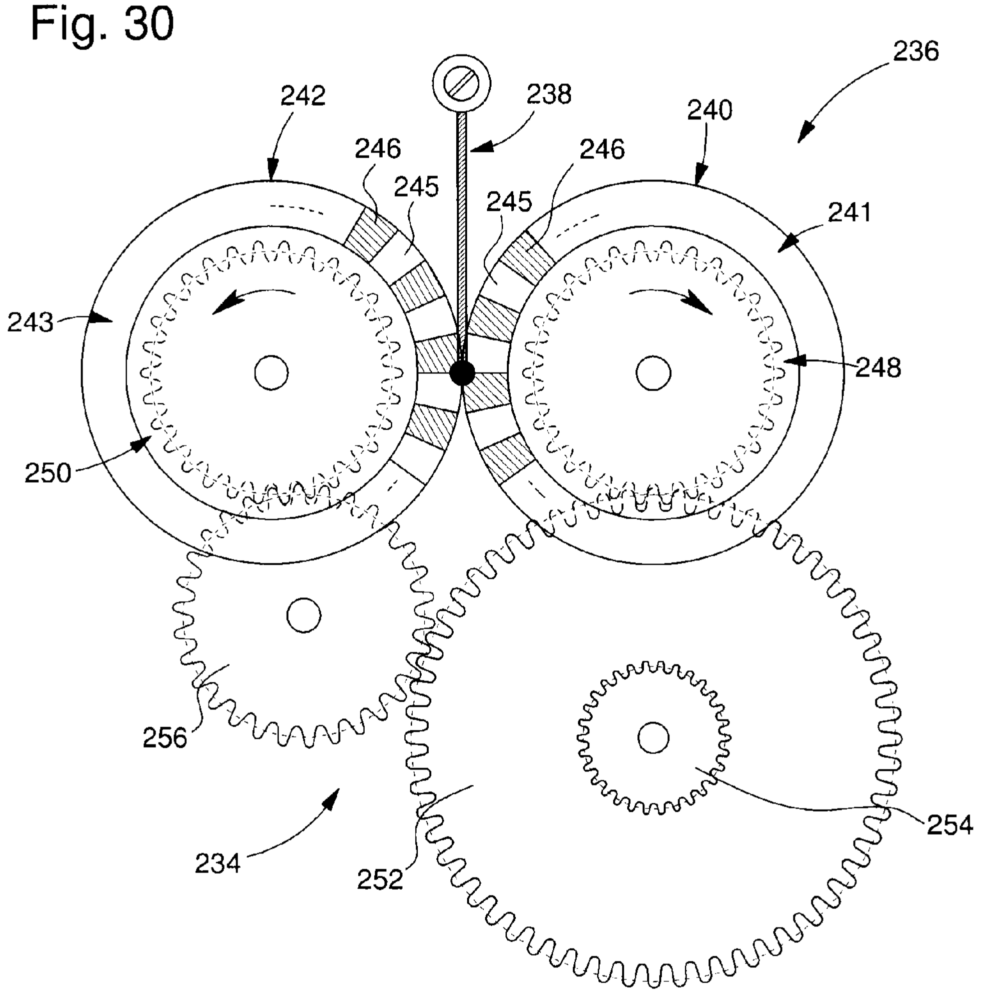
FIG. 30 is a schematic top view of a tenth embodiment of a regulating device according to the invention incorporated in a timepiece movement.

A tenth embodiment of the invention arranged in a timepiece movement 234 will be described below with reference to FIG. 30. Regulating device 236 includes a resonator 238 schematically represented by an elastic pin or strip which is fixed at a first end and carries a magnet at the free end thereof. The magnetic structure is particular in that it is formed by two annular magnetic paths 241 and 243 according to the invention which are respectively carried by two wheel sets 240 and 242 arranged side by side. Each annular magnetic path is arranged in the peripheral area of a plate of the respective wheel set. The two paths are located here in the same geometric plane and include alternating annular sectors 245 and 246 respectively similar to annular sectors 54 and 56 of the first embodiment. When the two plates have the same diameter, the two wheel sets are positioned so that the rest position (zero position) of the resonator magnet is situated at the middle of a straight line orthogonal to their respective axes of rotation and intercepting the two axes of rotation. More generally, in its rest position, the coupling element is located on a straight line connecting the two respective axes of rotation of the two wheel sets and at the interface of the two paths or at the middle thereof in projection in said geometric plane, these two paths exhibiting a shift of an angular half-period on said straight line.

The two wheel sets 240 and 242 are coupled in rotation by a drive wheel 252 integral with a pinion 254 receiving the drive torque. Wheel 252 meshes with a wheel 248 of first wheel set 240 located underneath its plate and thus directly drives in rotation this first wheel set in a determined direction of rotation. Wheel 252 also transmits the drive torque to the second wheel set 242 via an intermediate wheel 256 which meshes with a wheel 250 of said second wheel set located underneath its plate. Thus, the second wheel set rotates in an opposite direction to the first wheel set. The two annular paths have the same outer diameter and the gear ratios are arranged so that the angular speed of the two wheel sets is identical. In a variant, the two wheel sets can be directly coupled to each other by a gear, at least one of the two wheel sets receiving a torque force during operation. During assembly of the timepiece movement, it is ensured that these two annular paths are positioned so that at the zero position point of the magnet they have a phase shift of $\pi$ (a half-period shift as shown in FIG. 30).

It will be noted that the advantage of this tenth embodiment is that the two magnetic paths have identical dimensions but are arranged in the same geometric plane. This results in a perfect magnetic interaction symmetry between the resonator and the magnetic structure in the two oscillation vibrations of the resonator. In a particular variant, the two wheel sets are driven by two drive torques originating from two barrels incorporated in the same timepiece movement. It will also be noted that, in a variant that is not shown, the resonator could carry at least two coupling elements respectively coupled to the first path and the second path and placed elsewhere than on the aforementioned straight line connecting the two axes of rotation. It will be ensured that the second coupling element enters into interaction with the second magnetic path when the first coupling element leaves the first magnetic path and vice versa. This latter variant opens up several additional degrees of freedom in the arrangement of the oscillator and particularly of the two wheel sets. It is possible, for example, to provide that the two magnetic paths are respectively arranged on two parallel plates but at different levels.

Figure 31:
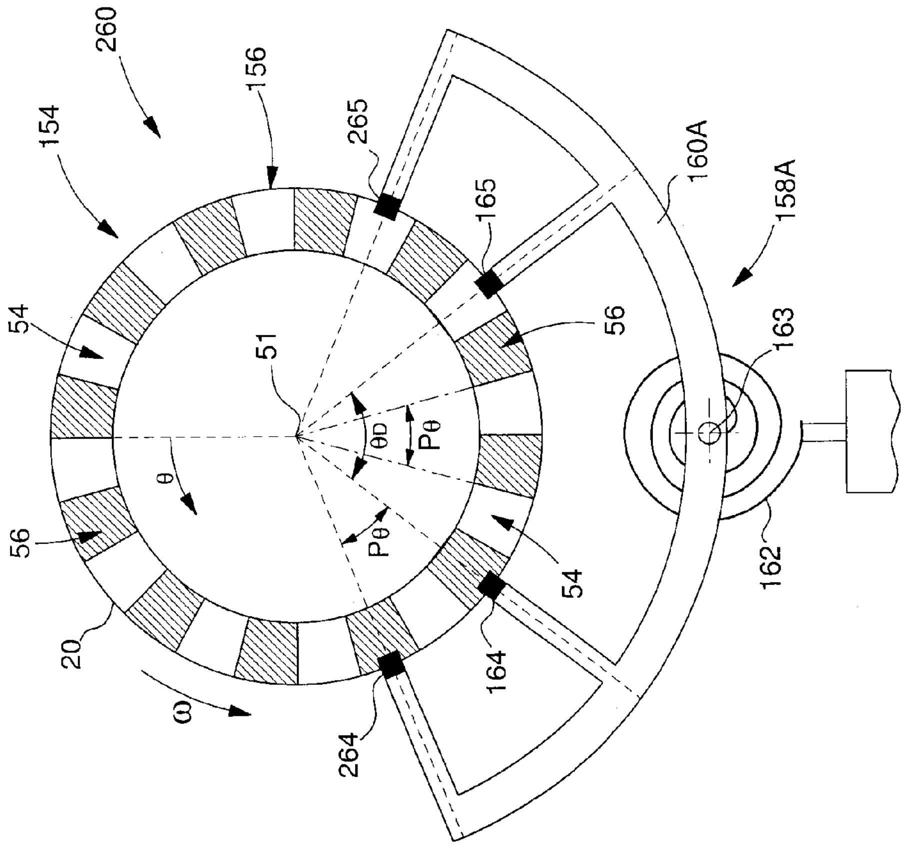
FIG. 31 is a first variant of the regulating device of FIG. 22.

FIG. 31 shows an oscillator 260 according to the invention which is a first variant of FIG. 22. This variant differs from that of FIG. 22 in that the resonator 158A includes a rigid balance 160A which carries two magnets 164 and 264, respectively 165 and 265 on each of its two arms. The two magnets of each arm simultaneously undergo magnetic interaction with annular magnetic path 156. They are phase shifted by an angular period $P_\theta$. Thus, it is understood that on a given zero position circle, for the resonator considered in its rest position, the number of coupling elements can be increased by providing an angular shift equal to $N \cdot P_\theta$, where N is a positive integer number (corresponding to a phase shift of N·360°) between the coupling elements which undergo the same motion (i.e. the same degree of freedom and same direction of motion) relative to a corresponding magnetic path.

Figure 32:
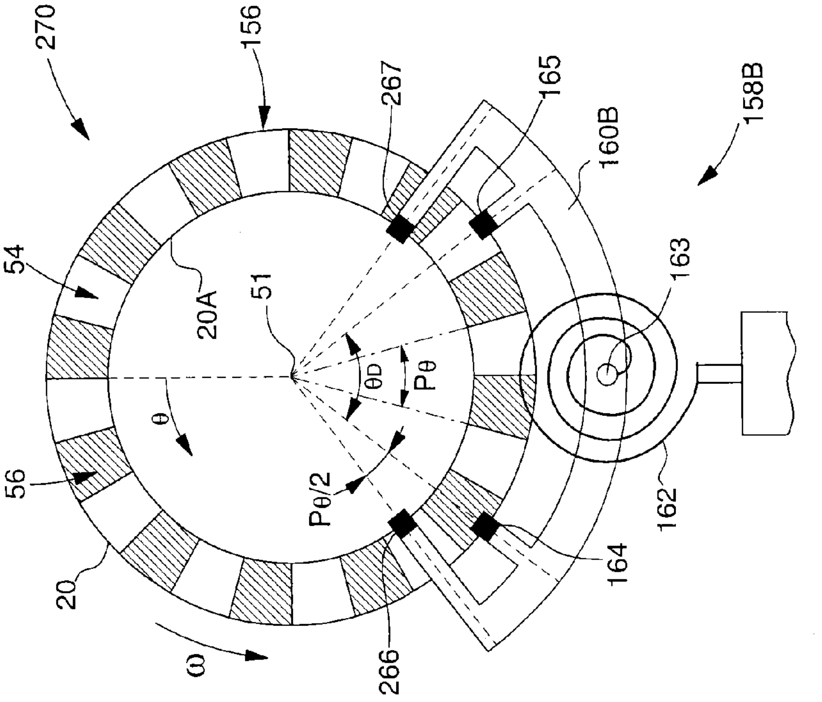
FIG. 32 is a second variant of the regulating device of FIG. 22.

FIG. 32 shows an oscillator 270 according to the invention which is a second variant of FIG. 22. This second variant differs from the first variant in that the two coupling elements, associated with the same arm of balance 160B of resonator 158B, are respectively positioned on the two zero position circles 20 and 20A defined by annular magnetic path 156, namely by the outer and inner circles defining this path, for the resonator considered in its rest position. In this case, the two coupling elements 164 and 266, respectively 165 and 267, have between them an angular phase shift of $P_\theta/2$ (namely 180°). It is understood that, for a given annular magnetic path, when the resonator is in its rest position, one or more coupling elements can be positioned on each of the two zero position circles defined by the path. For a balance arm, a first coupling element associated with the first zero position circle is angularly shifted from a second coupling element associated with the second zero position circle by $(N+1) \cdot P_\theta/2$, N>0.

Figure 33:
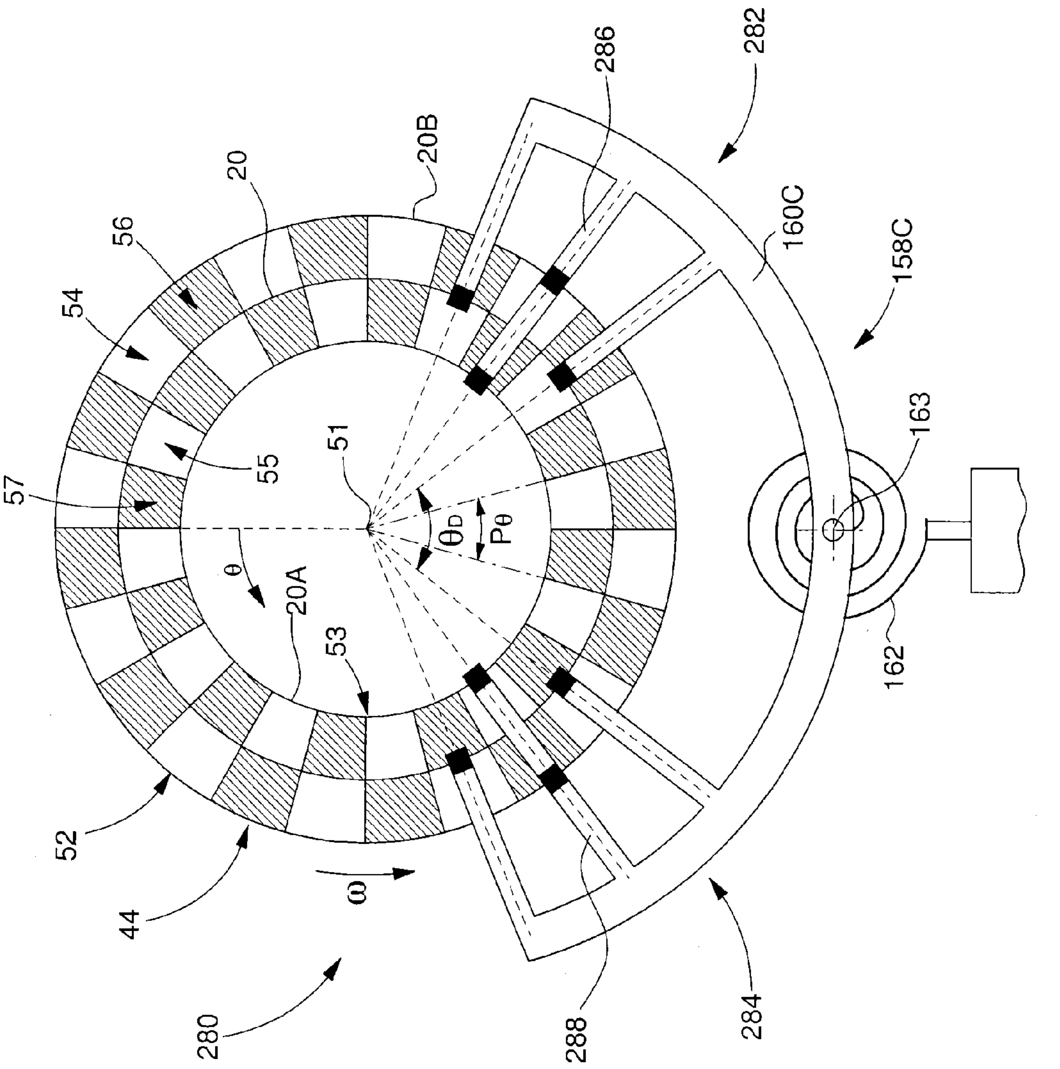
FIG. 33 is a variant of the regulating device of FIG. 23.

By combining the teaching drawn from the embodiments of FIGS. 31 and 32 and by using several annular magnetic paths, various oscillators can be devised according to the invention, particularly the oscillator 280 shown in FIG. 33. That oscillator includes a resonator 158C formed by a balance 160C which includes two arms 282 and 284 each carrying four coupling elements distributed over substantially one angular period of magnetic structure 44 (period of each of the two magnetic paths 52 and 53). Here there is a coupling element which interacts with the magnetic structure in each half-period of three successive half-periods of the magnetic structure, above which the four coupling elements associated with the same balance arm simultaneously extend. Since the variation in the physical parameter considered in each hatched sector is intended to be angular (with no radial variation over any given radius), it is preferably provided that the centre of rotation 163 of the sprung balance is located on a tangent to the zero position circle 20 at the intersection with intermediate branch 286, respectively 288, which carries two radially aligned coupling elements. Each of the coupling members is thus only subjected to a low radial force outside the impulse areas localised around the three zero position circles 20, 20A and 20B used in the embodiment of FIG. 33. This type of embodiment has the advantage of increasing the magnetic coupling between the resonator and the magnetic structure while conserving coupling elements with a small radial dimension and thus impulses delivered to the resonator which remain localised.

Embodiments with an inversion technique relative to the regulating devices described above will be described below with reference to the following Figures. In the preceding embodiments, the annular magnetic paths are extensive to cover at least the maximum intended oscillation amplitude (over one vibration), whereas the resonator coupling members have a relatively small dimension in the radial direction of annular magnetic paths associated with these resonators. It is, however, possible to obtain a similar interaction and the benefits of the present invention by inverting the dimensions of the magnetic sectors of the magnetic paths and of the resonator coupling members.

Figure 34:
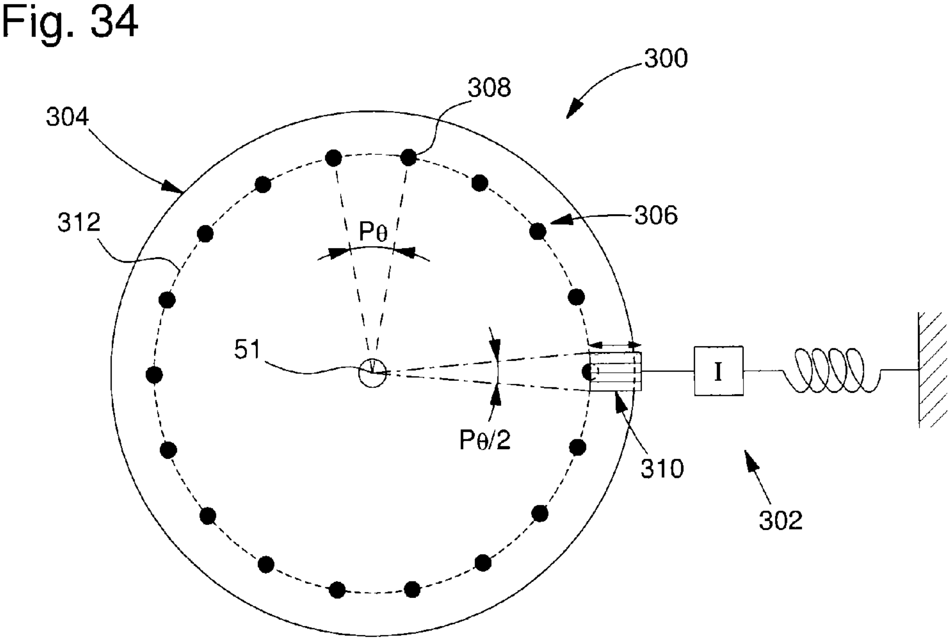
FIG. 34 is a schematic view of an eleventh embodiment wherein the resonator coupling element is extended radially while the annular magnetic path has a small width.

FIG. 34 is a schematic view of a variant of an eleventh embodiment corresponding to a technical inversion of the general embodiment of FIG. 11. Regulating device 300 includes a magnetic structure 304 forming a wheel and including an annular magnetic path 306 formed by magnets 308 which have a reduced radial dimension and are arranged periodically along a circle 312. Thus, this circle passes substantially through the middle of the magnets or through the centres of mass of the magnets. In general, the annular magnetic path defines, in axial projection in its general plane, a geometric circle radially located at the middle of the path or substantially passing through the centres of mass of a plurality of magnetic elements forming said magnetic path. This circle is also called the zero position circle by analogy with the preceding embodiments. Resonator 302 is arranged to undergo a radial oscillation. Its coupling element 310 is formed by a magnetized material and its active end portion, defining a magnetized section opposite the magnetic structure, extends in axial projection in a plane parallel to the general plane of the magnetic path in a substantially rectangular area with the inner angular edge thereof, i.e. in the angular direction of the wheel, substantially following, in axial projection, the zero position circle when the resonator is in a rest position (minimum potential resonator energy). This substantially rectangular area has an angular distance on circle 312 substantially equal to a half-period ($P_\theta/2$) of magnetic path 306 and a radial distance at least equal to the maximum oscillation amplitude of the coupling element over the vibration where it is coupled to magnetic path 306. The resonator is arranged relative to the magnetic structure so that circle 312 traverses, in axial projection, the active end portion of coupling element 310 during substantially a first vibration of each oscillation period of the coupling element when a drive torque within a useful torque range is delivered to the oscillator (formed by the resonator and the magnetic structure). The magnetized material of the coupling element forms a magnet axially oriented along geometric axis 51 like magnets 308, the latter having here inverted magnetic poles so that they are arranged to repulse the coupling element magnet.

The magnetized material of the coupling element has at least one physical parameter which is correlated to the magnetic potential energy of the oscillator when the magnetic resonator coupling element is magnetically coupled to annular magnetic path 306. In general, the regulating device according to this eleventh embodiment is characterized in that, within the useful drive torque range, the annular magnetic path and the magnetic coupling element define, in each angular period, as a function of their relative angular position θ and of the position of the coupling element along the degree of freedom, an area of accumulation of magnetic potential energy in the oscillator; and in that the magnetic material of the coupling element is arranged so that, at least in one area of the magnetic material coupled to the magnetic path for at least one part of the magnetic potential energy accumulation area of each angular period, the physical parameter correlated to the magnetic potential energy of the oscillator gradually increases angularly or gradually decreases angularly. The positive or negative variation in the physical parameter is chosen so that the magnetic potential energy of the oscillator increases angularly during a relative rotation between the resonator and the magnetic structure under the action of a drive torque. According to various variants, the physical parameter in question is, in particular, an air gap or the magnetic field flux generated by the coupling element magnet, as described above.

Figure 35:
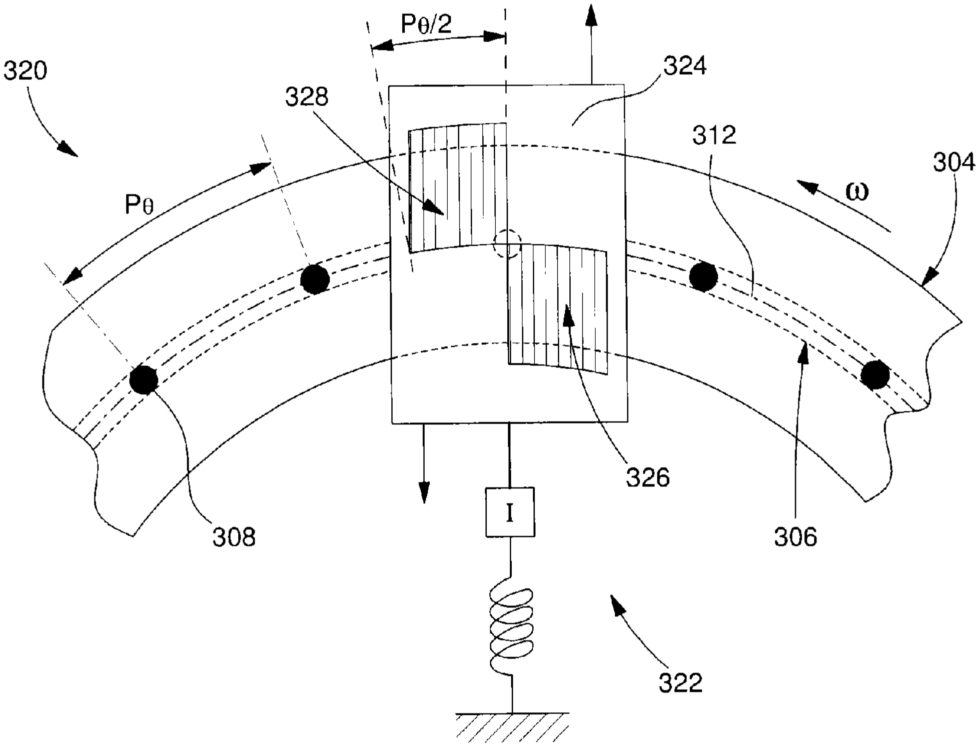
FIG. 35 is a schematic view of a twelfth embodiment of the invention.
Figure 36:
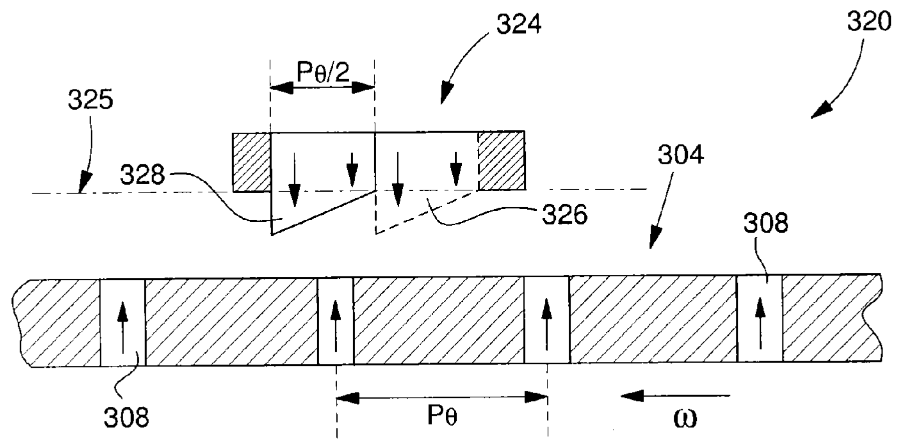
FIG. 36 is a schematic cross-section of FIG. 35 along the line defined by the circle 312.

A twelfth embodiment is schematically shown in FIGS. 35 and 36. Regulating device 320 corresponds to a technical inversion of the regulating device of FIG. 5. The magnetic structure 304 is identical to that of FIG. 34. Resonator 322 includes a plate 324 oscillating radially relative to the centre of annular magnetic path 306 and carrying two coupling elements 326 and 328 rigidly fixed to the plate. These two coupling elements are formed by two magnetized sections 326 and 328 which each extend over an angular distance on circle 312 substantially equal to a half-period $P_\theta/2$ of magnetic path 306 and are angularly shifted by a half-period (180° phase shift). Moreover, they are radially shifted so that the inner angular edge of magnetized section 328 and the outer angular edge of magnetized section 326 follow, in axial projection, zero position circle 312 when the resonator is in a rest position. The magnetized material forming the two coupling elements has a physical parameter correlated to the magnetic potential energy of the oscillator. Over at least a certain angular distance of each coupling element, this physical parameter gradually increases angularly or gradually decreases angularly so that the magnetic potential energy of the oscillator increases angularly during a relative rotation. The physical parameter is a distance between the lower surface of plate 324 and a general geometric plane 325 of the plate. This general geometric plane is parallel to the upper surface of magnetic structure 304 and thus to the general plane thereof. Further, the travel of this plate when it oscillates is also parallel to plane 325. In the case of a technical inversion, it will be noted that the potential energy must increase in the direction of relative rotation of magnetic structure 304, as shown in the cross-section of FIG. 36 where the coupled magnets are arranged in repulsion.

It will be noted that the magnetic areas of one variant of the regulating device of FIG. 35 may be obtained by an axial symmetry, along a radial axis located at the middle of an angular period and at the middle of the annular path and of the coupling member, of an angular period of the two magnetic paths 52 and 53 of coupling member 50 of FIG. 5. Next, the magnetic member thereby transferred is reproduced at every period of the magnetic path. The result is not, however, optimum as regards the variation in the considered physical parameter of the magnetized material in the potential energy accumulation areas. Thus, in the preferred variant shown in FIG. 35, the magnetized areas 326 and 328 were modified following the axial symmetry so that the magnetic potential energy in each accumulation area exhibits substantially no variation along the useful degree of freedom of the resonator. This is why, in FIG. 35, the variation in the considered physical parameter is perpendicular to the direction of oscillation of plate 324. The magnetic potential energy of the oscillator is therefore similar to that described above with reference to FIGS. 7, 8 and 9A-9C.

It will be noted that every previously described embodiment, with at least one radially extended magnetic path and one resonator including a coupling element of small radial dimension or several such coupling elements shifted by an integer number of angular periods, can provide an inverted embodiment by applying the present method to each coupling element whereby there is transferred, according to the case, a single annular sector (a magnetic half-period) as in FIG. 34 or two annular sectors (a magnetic period) as in FIG. 35. One advantage of the regulating device according to the twelfth embodiment compared to the first embodiment flows from the fact that the extended magnetic areas 326 and 328 are on the resonator and can therefore have the same dimensions, identical linear variation in the considered physical parameter to generate magnetic potential energy accumulation gradients or ramps, and lateral edges with a curve exactly along the degree of freedom of the coupling member. Another advantage is the greater manufacturing simplicity of the oscillator. Indeed, to obtain the desired periodic magnetic potential, it is possible to produce a magnetic structure (wheel with at least one magnetic path) which exhibits no variation in a physical parameter of the magnetic material of which it is formed; since it is sufficient here to form the extended coupling element(s) of the resonator with a magnetic material exhibiting angular variation of a physical parameter correlated to the magnetic potential energy of the oscillator. This is easier to achieve given the more limited number of resonator coupling elements relative to the number of angular periods of the annular magnetic path(s).

Figure 37:
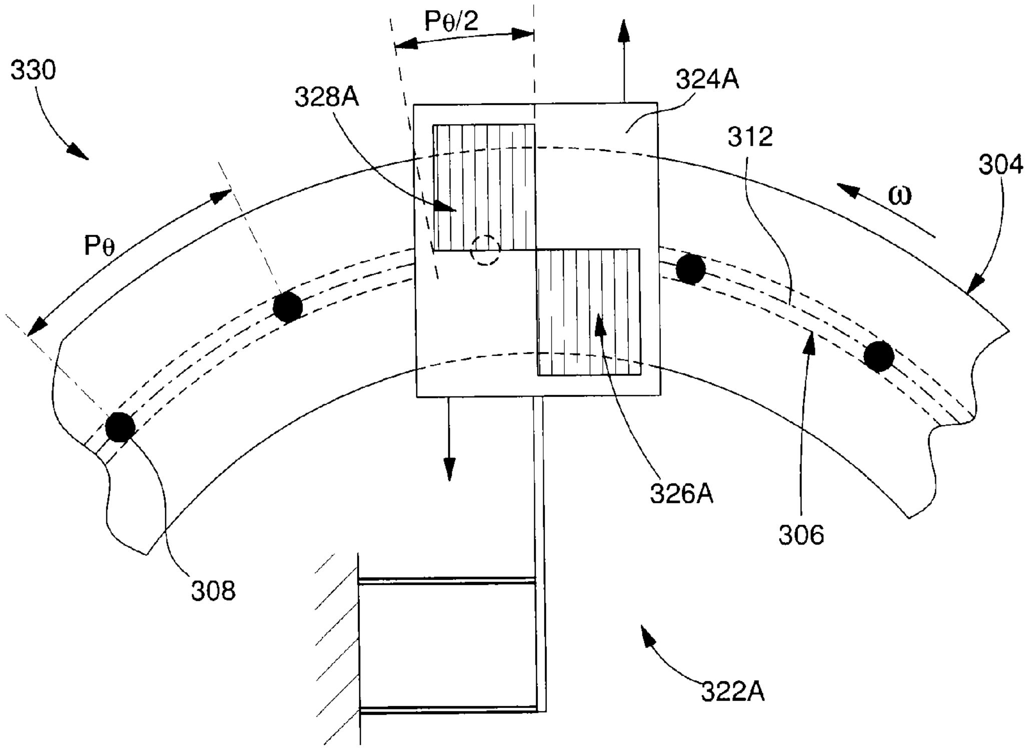
FIG. 37 is a variant embodiment of FIG. 36.

FIG. 37 shows a variant of FIG. 35. Regulating device 330 differs in that the two coupling elements 326A and 328A arranged on plate 324A of resonator 322A have, at the end thereof facing the magnetic structure, a square or rectangular area in axial projection in a plane parallel to the magnetic path. In particular, the inner angular edge of annular area 328A and the outer angular edge of annular area 326A are rectilinear. Insofar as the angular period remains relative small, in particular less than 45°, this variant is functionally very close to that of FIG. 35, effectively adjusting the resonator rest position relative to the annular magnetic path. It is thus also possible to obtain good isochronism and a reasonable operating range which is relatively extensive.

Figure 38:
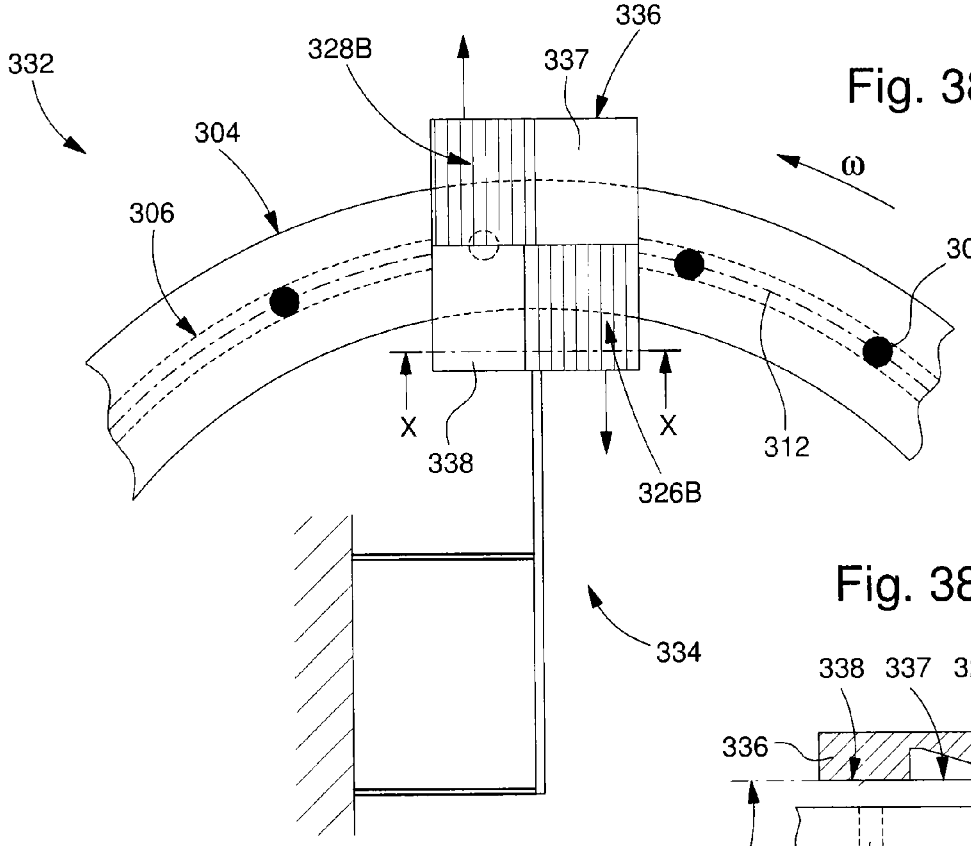
FIG. 38 is a schematic view of a thirteenth embodiment of the invention.
Figure 38A:
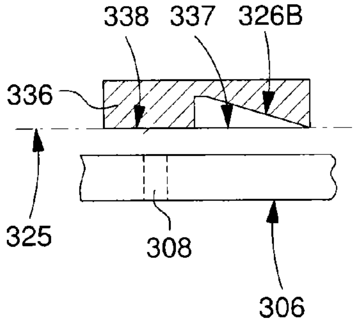
FIG. 38A is a transverse cross-section along line X-X.

FIGS. 38 and 38A concern a thirteenth embodiment of the invention which provides for magnetic interaction by attraction. In this case, it is necessary to introduce a magnetic material into the areas located radially opposite the energy accumulation areas, on the other side of the zero position circle, so that these areas have lower or minimum magnetic potential energy. Regulating device 332 includes an annular magnetic path 306 described above and a schematically shown resonator 334, the latter including a plate of ferromagnetic material which oscillates at the intended resonant frequency. Plate 336 extends in a general plane 325 and includes two areas 326B and 328B whose distance to this general plane, respectively the air gap between the magnetic path, increases in the direction of rotation of the magnetic path to each create a potential energy accumulation area over a relatively large angular distance. Moreover, this plate includes two complementary areas 337 and 338 also formed by the ferromagnetic material and having a minimum air gap with the magnetic path. It is therefore possible to obtain the impulses for maintaining the oscillation of resonator 334. It will be noted that the angular dimension of the plate is preferably arranged to be equal to the linear distance between the centres of two successive magnets 308. This overcomes a problem linked to the fact that outside the area of superposition with the plate, the magnets have high potential energy. Indeed, with this angular distance, when a magnet leaves the area of superposition, the next magnet simultaneously enters the area of superposition so that the angular forces on the plate 336 cancel out each other. It is therefore understood that it is possible to implement a technical inversion for the first ten embodiments and conceivable variants thereof.

Figure 39:
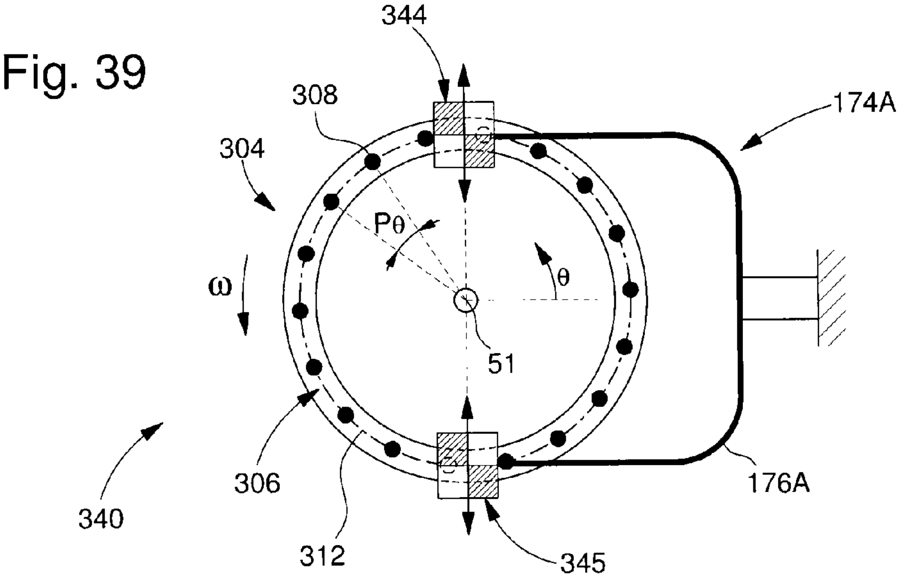
FIG. 39 is a schematic view of a fourteenth embodiment of the invention.

FIG. 39 is a schematic view of a fourteenth embodiment applying the technical inversion method explained above to the regulating device of FIG. 24. There is thus obtained a regulating device 340 with a resonator 174A formed by a tuning fork 176A having, at the two free ends thereof, two magnetic plates 344 and 345, similar to plate 324A of FIG. 37 or to plate 336 of FIG. 38. The two plates 344 and 35 oscillate in opposite directions and each include two coupling elements similar to the magnetic areas 326A and 328A, respectively 326B and 328B in a variant, of FIGS. 37 and 38. Magnetic structure 304 corresponds to that described above. In an advantageous variant in which the tuning fork is perfectly symmetrical (by subjecting one of the two plates to an axial symmetry about an axis of symmetry substantially tangent to the zero position circle), an odd number of coupling elements 308 must be provided on wheel 304.

Figure 40:
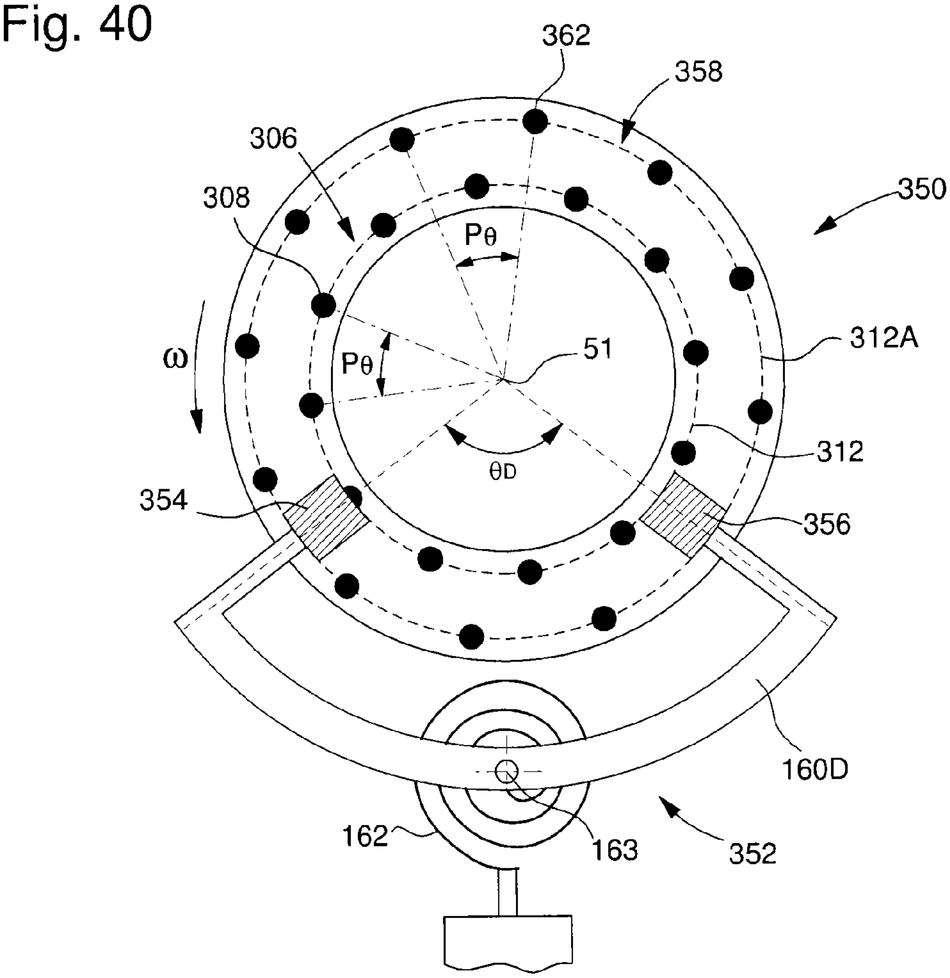
FIG. 40 is a schematic view of a fifteenth embodiment of the invention.

FIG. 40 shows a fifteenth embodiment of the type described starting from FIG. 34. This embodiment concerns a case with two concentric magnetic paths of small radial dimension on the structure. Regulating device 350 is functionally similar to the embodiment of FIG. 32. This regulating device 350 is formed by an oscillator including a resonator 352 of the sprung balance type and a magnetic structure 358 forming a wheel driven in rotation about geometric axis 51 by a drive torque provided by the timepiece movement which incorporates the regulating device. The resonator therefore has a balance spring 162 or other suitable elastic element and a balance 160D having two arms whose respective two free ends respectively carry two coupling elements 354 and 356. Each coupling element is formed by a magnetized area similar to element 310 of FIG. 34. Magnetic structure 358 includes a first magnetic path 306 described above and also a second magnetic path 360 concentric to the first magnetic path and formed by a plurality of magnets 362 regularly distributed with an identical angular period to that of the first magnetic path but with an angular shift of a half-period; these two paths thus having a 180° phase shift. In the variant shown, magnets 308 and 362 are arranged in repulsion relative to the two magnetized areas 354 and 356. The first and second magnetic paths are arranged so that two zero position circles 312 and 312A are respectively substantially located perpendicular to the inner and outer angular edges of each of the two magnetized areas 354 and 356. These two magnetized areas are shifted by an angle $\theta_D = P_\theta \cdot (2N+1)/2$, N being an integer number.

It will be noted that the embodiment of FIG. 40 is obtained by applying the technical inversion described above starting from FIG. 32 and by applying it with a first balance arm carrying magnets 164 and 266. Next, since the magnets 165 and 267 of the second arm are phase shifted by 180° relative to those of the first arm, the hatched area of the magnetic path transferred onto the resonator must be phase shifted by 180° to obtain an equivalent situation with the magnets already arranged on the magnetic structure by an axial symmetry applied to the first arm. The magnetic interaction within the oscillator is thus equivalent for the devices of FIGS. 32 and 40.

Finally, it will be noted that oscillator 350 can also be obtained from the oscillator of FIG. 23 with the aid of a second method consisting in inverting the dimensions of the magnetic areas of the magnetic structure and of the resonator. Each hatched area of the magnetic paths is replaced by a magnet of small radial width at the centre of the hatched area and the two resonator magnets are replaced by two magnetized areas having substantially the dimensions of a hatched sector of one path of the oscillator of FIG. 23. By using the first and second technical inversion methods, those skilled in the art can easily create other regulating devices having radially extended magnetic sections carried by the resonator.

What is claimed is:

1. A device for regulating a relative angular speed between a magnetic structure and a resonator, the regulating device comprising:

the magnetic structure and the resonator which are magnetically coupled so as to define together an oscillator forming said regulating device;

the magnetic structure including at least one annular magnetic path centered on an axis of rotation of said magnetic structure or of the resonator, the magnetic structure and the resonator being arranged to undergo a rotation of one relative to each other about said axis of rotation when a drive torque is applied to the magnetic structure or to the resonator;

the resonator including at least one magnetic coupling element to said annular magnetic path;

said annular magnetic path being at least partially formed of a first magnetic material of which at least one physical parameter is correlated to a magnetic potential energy of the oscillator but different therefrom, said first magnetic material being arranged along the annular magnetic path so that the magnetic potential energy of the oscillator varies angularly in a periodic manner along said annular magnetic path and that it defines an angular period of the annular magnetic path;

said magnetic coupling element having an active end portion, located on a side of said magnetic structure, which is magnetically coupled to said annular magnetic path so that an oscillation along a degree of freedom of a resonant mode of the resonator is maintained within a useful drive torque range applied to the magnetic structure or to the resonator and so that a determined integer number of periods of said oscillation occurs during said relative rotation in each angular period of the annular magnetic path, a frequency of said oscillation thus determining said relative angular speed;

said resonator being arranged relative to said magnetic structure so that said active end portion of said magnetic coupling element is at least mostly superposed, in orthogonal projection to a general geometric surface defined by said annular magnetic path, to said annular magnetic path only during substantially a first vibration in each period of said oscillation, and so that a travel of the magnetic coupling element during this first vibration is substantially parallel to said general geometric surface, said annular magnetic path having a dimension along said degree of freedom which is greater than a dimension of said active end portion of said magnetic coupling element along said degree of freedom;

wherein, within said useful drive torque range, said annular magnetic path and said magnetic coupling element define in each angular period, as a function of a relative position thereof defined by their relative angular position and a position of the coupling element along its degree of freedom, an area of accumulation of the magnetic potential energy in the oscillator;

wherein said first magnetic material is arranged in each angular period so that, at least in one area of said first magnetic material magnetically coupled at least partially to said active end portion for relative positions of the magnetic coupling element with respect to the annular magnetic path corresponding to at least one portion of the magnetic potential energy accumulation area in said each angular period, said physical parameter gradually increases angularly or gradually decreases angularly; and wherein the gradual angular increase or decrease of said physical parameter, in each angular period of said annular magnetic path, extends over an angular distance, relative to said axis of rotation, which is more than or substantially equal to forty percent (40%) of this angular period.

2. The regulating device according to claim 1, wherein said magnetic coupling element and said annular magnetic path are arranged so that the magnetic coupling element receives, during said relative rotation, impulses along its degree of freedom about a rest position of said magnetic coupling element;

said impulses defining, as a function of the relative position of the magnetic coupling element with respect to the annular magnetic path and for said useful drive torque range delivered to the regulating device, impulse areas which are substantially localised in a central impulse area adjacent to magnetic potential energy accumulation areas.

3. The regulating device according to claim 2, wherein said magnetic structure is arranged so that a mean angular gradient of said magnetic potential energy in said magnetic potential energy accumulation areas is significantly less than a mean magnetic potential energy gradient in said impulse areas along said degree of freedom and in a same unit.

4. The regulating device according to claim 3, wherein a ratio of said mean angular gradient to said mean magnetic potential energy gradient along said degree of freedom is less than sixty percent (60%).

5. The regulating device according to claim 3, wherein a ratio of said mean angular gradient to said mean magnetic potential energy gradient along said degree of freedom is less than or substantially equal to forty percent (40%).

6. A timepiece movement wherein the movement comprises the regulating device according to claim 3, said regulating device defining a resonator and a magnetic escapement and serving to regulate a working of at least one mechanism of said timepiece movement.

7. The regulating device according to claim 2, wherein a ratio between a radial dimension of the impulse areas and a radial dimension of the magnetic potential energy accumulation areas is less than fifty percent (50%).

8. The regulating device according to claim 2, wherein a ratio between a radial dimension of the impulse areas and a radial dimension of the magnetic potential energy accumulation areas is less than or substantially equal to thirty percent (30%).

9. The regulating device according to claim 2, wherein the magnetic potential energy in each magnetic potential energy accumulation area exhibits substantially no variation along the degree of freedom of the useful resonant mode of the resonator.

10. The regulating device according to claim 2, wherein the rest position of the coupling element defines a zero position circle in a reference frame linked to the magnetic structure during said relative rotation between said magnetic structure and the resonator, and wherein the zero position circle and said degree of freedom are substantially orthogonal at their point of intersection.

11. The regulating device according to claim 10, wherein a variation in said physical parameter is only angular in areas of said first magnetic material corresponding respectively to the magnetic potential energy accumulation areas in the oscillator.

12. The regulating device according to claim 10, wherein said coupling element is a first coupling element and the regulating device includes at least a second coupling element also magnetically coupled to said magnetic structure, and wherein the first and second coupling elements define, with said annular magnetic path, a same zero position circle.

13. The regulating device according to claim 10, wherein said coupling element is a first coupling element and the regulating device includes at least a second coupling element also magnetically coupled to said magnetic structure, and wherein the first and second coupling elements define, with said annular magnetic path, respectively two different zero position circles, which are substantially superposed respectively on inner and outer circles defining said path.

14. The regulating device according to claim 1, wherein said physical parameter is a distance between the annular magnetic path and a surface of revolution which has said axis of rotation as an axis of revolution and said degree of freedom as a generatrix of said surface of revolution, said distance substantially corresponding to an air gap between said magnetic coupling element and said annular magnetic path.

15. The regulating device according to claim 1, wherein said first magnetic material is formed of a magnetized material, and wherein said physical parameter is an intensity of magnetic field flux generated by the magnetized material between said annular magnetic path and a surface of revolution which has said axis of rotation as an axis of revolution and said degree of freedom as a generatrix of said surface of revolution.

16. The regulating device according to claim 1, wherein a variation in said physical parameter is obtained by a plurality of holes in said first magnetic material whose density and/or section surface varies.

17. The regulating device according to claim 1, wherein said annular magnetic path defines a first path, wherein said magnetic structure further includes a second annular magnetic path coupled to said coupling element in a similar manner as said coupling element is coupled to the first path, said second path being at least partially formed of a magnetic material which exhibits a variation along this second path so that the magnetic potential energy of the oscillator varies angularly along the second path with said angular period and in a similar manner as a variation of the first path, and wherein the first and second paths have an angular shift equal to half said angular period.

18. The regulating device according to claim 1, wherein said annular magnetic path defines a first path, wherein the regulating device further includes a second annular magnetic path coupled to said coupling element or to another coupling element of said resonator in a similar manner as said coupling element is coupled to the first path, said second path being at least partially formed of a magnetic material which exhibits a variation along this second path so that the magnetic potential energy of the oscillator varies angularly along the second path in a similar manner as a variation of the first path; and wherein the first and second annular magnetic paths are respectively integral with two wheel sets.

19. The regulating device according to claim 1, wherein said coupling element is a first coupling element, and wherein the regulating device includes at least a second coupling element also magnetically coupled to said magnetic structure.

20. The regulating device according to claim 19, wherein said resonator is formed by a tuning fork wherein two free ends of a resonant structure respectively carry the first and second magnetic coupling elements.

21. The regulating device according to claim 19, wherein said resonator includes a substantially rigid structure carrying the first and second magnetic coupling elements and associated with one or respectively two elastic elements of the resonator.

22. The regulating device according to claim 1, wherein said resonator is of a type having a sprung balance or a balance with flexible strips.

23. The regulating device according to claim 1, wherein said resonator defines a first resonator and wherein the regulating device includes at least a second resonator magnetically coupled to said magnetic structure in a similar manner to the first resonator.

24. The regulating device according to claim 1, wherein said magnetic structure and said magnetic coupling element are magnetized to repel each other.

25. A timepiece movement wherein the movement comprises the regulating device according to claim 1, said regulating device defining a resonator and a magnetic escapement and serving to regulate a working of at least one mechanism of said timepiece movement.

26. A device for regulating a relative angular speed between a magnetic structure and a resonator, the regulating device comprising:

the magnetic structure and the resonator which are magnetically coupled so as to define together an oscillator forming said regulating device;

the magnetic structure including at least one annular magnetic path centered on an axis of rotation of said magnetic structure or of the resonator, the magnetic structure and the resonator being arranged to undergo a rotation of one relative to each other about said axis of rotation when a drive torque is applied to the magnetic structure or to the resonator;

the resonator including at least one magnetic coupling element to said annular magnetic path;

said annular magnetic path being at least partially formed of a first magnetic material of which at least one physical parameter is correlated to a magnetic potential energy of the oscillator but different therefrom, said first magnetic material being arranged along the annular magnetic path so that the magnetic potential energy of the oscillator varies angularly in a periodic manner along said annular magnetic path and that it defines an angular period of the annular magnetic path;

said magnetic coupling element having an active end portion, located on a side of said magnetic structure, which is magnetically coupled to said annular magnetic path so that an oscillation along a degree of freedom of a resonant mode of the resonator is maintained within a useful drive torque range applied to the magnetic structure or to the resonator and so that a determined integer number of periods of said oscillation occurs during said relative rotation in each angular period of the annular magnetic path, a frequency of said oscillation thus determining said relative angular speed;

said resonator being arranged relative to said magnetic structure so that said active end portion of said magnetic coupling element is at least mostly superposed, in orthogonal projection to a general geometric surface defined by said annular magnetic path, to said annular magnetic path only during substantially a first vibration in each period of said oscillation, and so that a travel of the magnetic coupling element during this first vibration is substantially parallel to said general geometric surface, said annular magnetic path having a dimension along said degree of freedom which is greater than a dimension of said active end portion of said magnetic coupling element along said degree of freedom;

wherein, within said useful drive torque range, said annular magnetic path and said magnetic coupling element define in each angular period, as a function of a relative position thereof defined by their relative angular position and a position of the coupling element along its degree of freedom, an area of accumulation of the magnetic potential energy in the oscillator;

wherein said first magnetic material is arranged in each angular period so that, at least in one area of said first magnetic material magnetically coupled at least partially to said active end portion for relative positions of the magnetic coupling element with respect to the annular magnetic path corresponding to at least one portion of the magnetic potential energy accumulation area in said each angular period, said physical parameter gradually increases angularly or gradually decreases angularly;

wherein said magnetic coupling element and said annular magnetic path are arranged so that the magnetic coupling element receives, during said relative rotation, impulses along its degree of freedom about a rest position of said magnetic coupling element;

said impulses defining, as a function of the relative position of the magnetic coupling element with respect to the annular magnetic path and for said useful drive torque range delivered to the regulating device, impulse areas which are substantially localised in a central impulse area adjacent to magnetic potential energy accumulation areas; and wherein said magnetic structure is arranged so that, in a same unit, a mean angular gradient of said magnetic potential energy in said magnetic potential energy accumulation areas is less than a mean magnetic potential energy gradient in said impulse areas along said degree of freedom.

27. A device for regulating a relative angular speed between a magnetic structure and a resonator, the regulating device comprising:

the magnetic structure and the resonator which are magnetically coupled so as to define together an oscillator forming said regulating device;

the magnetic structure including at least one annular magnetic path centered on an axis of rotation of said magnetic structure or of the resonator, the magnetic structure and the resonator being arranged to undergo a rotation of one relative to each other about said axis of rotation when a drive torque is applied to the magnetic structure or to the resonator;

the resonator including at least one magnetic coupling element to said annular magnetic path;

said annular magnetic path being at least partially formed of a first magnetic material of which at least one physical parameter is correlated to a magnetic potential energy of the oscillator but different therefrom, said first magnetic material being arranged along the annular magnetic path so that the magnetic potential energy of the oscillator varies angularly in a periodic manner along said annular magnetic path and that it defines an angular period of the annular magnetic path;

said magnetic coupling element having an active end portion, located on a side of said magnetic structure, which is magnetically coupled to said annular magnetic path so that an oscillation along a degree of freedom of a resonant mode of the resonator is maintained within a useful drive torque range applied to the magnetic structure or to the resonator and so that a determined integer number of periods of said oscillation occurs during said relative rotation in each angular period of the annular magnetic path, a frequency of said oscillation thus determining said relative angular speed;

said resonator being arranged relative to said magnetic structure so that said active end portion of said magnetic coupling element is at least mostly superposed, in orthogonal projection to a general geometric surface defined by said annular magnetic path, to said annular magnetic path only during substantially a first vibration in each period of said oscillation, and so that a travel of the magnetic coupling element during this first vibration is substantially parallel to said general geometric surface, said annular magnetic path having a dimension along said degree of freedom which is greater than a dimension of said active end portion of said magnetic coupling element along said degree of freedom;

wherein, within said useful drive torque range, said annular magnetic path and said magnetic coupling element define in each angular period, as a function of a relative position thereof defined by their relative angular position and a position of the coupling element along its degree of freedom, an area of accumulation of the magnetic potential energy in the oscillator;

wherein said first magnetic material is arranged in each angular period so that, in at least one area of said first magnetic material magnetically coupled at least partially to said active end portion for relative positions of the magnetic coupling element with respect to the annular magnetic path corresponding to at least one portion of the magnetic potential energy accumulation area in said each angular period, said physical parameter gradually increases angularly or gradually decreases angularly; and wherein an angular distance of said at least one area of said first magnetic material in which said physical parameter, in each angular period, gradually increases angularly or gradually decreases angularly is greater than an angular dimension, relative to said axis of rotation, of said active end portion.

28. The regulating device according to claim 27, wherein said magnetic coupling element and said annular magnetic path are arranged so that the magnetic coupling element receives, during said relative rotation, impulses along its degree of freedom about a rest position of said magnetic coupling element;

said impulses defining, as a function of the relative position of the magnetic coupling element with respect to the annular magnetic path and for said useful drive torque range delivered to the regulating device, impulse areas which are substantially localised in a central impulse area adjacent to magnetic potential energy accumulation areas.

29. The regulating device according to claim 28, wherein said magnetic structure is arranged so that a mean angular gradient of said magnetic potential energy in said magnetic potential energy accumulation areas is significantly less than a mean magnetic potential energy gradient in said impulse areas along said degree of freedom and in a same unit.

30. The regulating device according to claim 29, wherein a ratio of said mean angular gradient to said mean magnetic potential energy gradient along said degree of freedom is less than sixty percent (60%).

31. The regulating device according to claim 29, wherein a ratio of said mean angular gradient to said mean magnetic potential energy gradient along said degree of freedom is less than or substantially equal to forty percent (40%).

32. A timepiece movement wherein the movement comprises the regulating device according to claim 29, said regulating device defining a resonator and a magnetic escapement and serving to regulate a working of at least one mechanism of said timepiece movement.

33. The regulating device according to claim 28, wherein a ratio between a radial dimension of the impulse areas and a radial dimension of the magnetic potential energy accumulation areas is less than fifty percent (50%).

34. The regulating device according to claim 28, wherein a ratio between a radial dimension of the impulse areas and a radial dimension of the magnetic potential energy accumulation areas is less than or substantially equal to thirty percent (30%).

35. The regulating device according to claim 28, wherein the magnetic potential energy in each magnetic potential energy accumulation area exhibits substantially no variation along the degree of freedom of the useful resonant mode of the resonator.

36. The regulating device according to claim 28, wherein the rest position of the coupling element defines a zero position circle in a reference frame linked to the magnetic structure during said relative rotation between said magnetic structure and the resonator, and wherein the zero position circle and said degree of freedom are substantially orthogonal at their point of intersection.

37. The regulating device according to claim 36, wherein a variation in said physical parameter is only angular in areas of said first magnetic material corresponding respectively to the magnetic potential energy accumulation areas in the oscillator.

38. The regulating device according to claim 36, wherein said coupling element is a first coupling element and the regulating device includes at least a second coupling element also magnetically coupled to said magnetic structure, and wherein the first and second coupling elements define, with said annular magnetic path, a same zero position circle.

39. The regulating device according to claim 36, wherein said coupling element is a first coupling element and the regulating device includes at least a second coupling element also magnetically coupled to said magnetic structure, and wherein the first and second coupling elements define, with said annular magnetic path, respectively two different zero position circles, which are substantially superposed respectively on inner and outer circles defining said path.

40. The regulating device according to claim 27, wherein the gradual increase or decrease of said physical parameter, in each angular period of said annular magnetic path, extends over the angular distance, relative to said axis of rotation, which is more than twenty percent (20%) of this angular period.

41. The regulating device according to claim 27, wherein the gradual increase or decrease of said physical parameter, in each angular period of said annular magnetic path, extends over the angular distance, relative to said axis of rotation, which is more than or substantially equal to forty percent (40%) of this angular period.

42. The regulating device according to claim 27, wherein said annular magnetic path defines a first path, wherein said magnetic structure further includes a second annular magnetic path coupled to said coupling element in a similar manner as said coupling element is coupled to the first path, said second path being at least partially formed of a magnetic material which exhibits a variation along this second path so that the magnetic potential energy of the oscillator varies angularly along the second path with said angular period and in a similar manner as a variation of the first path, and wherein the first and second paths have an angular shift equal to half said angular period.

43. The regulating device according to claim 27, wherein said annular magnetic path defines a first path, wherein the regulating device further includes a second annular magnetic path coupled to said coupling element or to another coupling element of said resonator in a similar manner as said coupling element is coupled to the first path, said second path being at least partially formed of a magnetic material which exhibits a variation along this second path so that the magnetic potential energy of the oscillator varies angularly along the second path in a similar manner as a variation of the first path; and wherein the first and second annular magnetic paths are respectively integral with two wheel sets.

44. The regulating device according to claim 27, wherein said coupling element is a first coupling element, and wherein the regulating device includes at least a second coupling element also magnetically coupled to said magnetic structure.

45. The regulating device according to claim 27, wherein said resonator is of a type having a sprung balance or a balance with flexible strips.

46. The regulating device according to claim 27, wherein said magnetic structure and said magnetic coupling element are magnetized to repel each other.

47. A timepiece movement wherein the movement comprises the regulating device according to claim 27, said regulating device defining a resonator and a magnetic escapement and serving to regulate a working of at least one mechanism of said timepiece movement.

* * * * *